(12) United States Patent
Weston

(10) Patent No.: US 10,949,198 B1
(45) Date of Patent: Mar. 16, 2021

(54) ONLINE PLATFORM FOR FACILITATING THE DEVELOPMENT OF SOFTWARE APPLICATIONS BASED ON AN EXECUTABLE STATECHART

(71) Applicant: Clarence Yandell Weston, Elkridge, MD (US)

(72) Inventor: Clarence Yandell Weston, Elkridge, MD (US)

( * ) Notice: Subject to any disclaimer, the term of this patent is extended or adjusted under 35 U.S.C. 154(b) by 0 days.

(21) Appl. No.: 16/751,587

(22) Filed: Jan. 24, 2020

(51) Int. Cl.
| | | |
|---|---|---|
| *G06F 8/76* | (2018.01) | |
| *G06F 9/44* | (2018.01) | |
| *G06F 9/54* | (2006.01) | |
| *G06F 9/448* | (2018.01) | |

(52) U.S. Cl.
CPC .............. *G06F 8/76* (2013.01); *G06F 9/4498* (2018.02); *G06F 9/546* (2013.01)

(58) Field of Classification Search
None
See application file for complete search history.

(56) References Cited

U.S. PATENT DOCUMENTS

| | | | | |
|---|---|---|---|---|
| 10,423,390 | B1* | 9/2019 | Mani | G06F 8/30 |
| 2007/0204117 | A1* | 8/2007 | Van Riel | G06F 12/0804 |
| | | | | 711/159 |
| 2007/0282593 | A1* | 12/2007 | Thompson | G06F 40/289 |
| | | | | 704/9 |
| 2011/0283254 | A1* | 11/2011 | Merriman | G06F 8/51 |
| | | | | 717/105 |
| 2015/0020080 | A1* | 1/2015 | Simsek | G06F 9/546 |
| | | | | 719/314 |
| 2015/0066157 | A1* | 3/2015 | Karypis | G06F 9/4843 |
| | | | | 700/3 |
| 2015/0160988 | A1* | 6/2015 | Scomparim | G06F 9/4488 |
| | | | | 719/318 |
| 2016/0189331 | A1* | 6/2016 | Costa | G06T 1/60 |
| | | | | 345/173 |
| 2017/0116400 | A1* | 4/2017 | Takacs | G06F 21/606 |
| 2017/0323089 | A1* | 11/2017 | Duggal | G06F 21/126 |
| 2019/0102206 | A1* | 4/2019 | Fichtenholtz | G06F 9/5027 |
| 2019/0146644 | A1* | 5/2019 | Jain | G06F 40/106 |
| | | | | 715/738 |
| 2019/0294504 | A1* | 9/2019 | Giannetti | G06F 11/1438 |
| 2019/0317837 | A1* | 10/2019 | Fletcher | G06F 9/5072 |
| 2020/0097390 | A1* | 3/2020 | Gunter | G06F 11/3664 |
| 2020/0344123 | A1* | 10/2020 | Prendergast | H04L 61/1511 |

* cited by examiner

*Primary Examiner* — Philip Wang

(57) ABSTRACT

Disclosed herein is an online platform for facilitating the development of software applications based on an executable statechart using a microservices architecture, in accordance with some embodiments. Accordingly, the online platform may include a communication device, a processing device, and a storage device. Further, the communication device may be configured for transmitting a software application design interface to a user device. Further, the communication device may be configured for receiving a plurality of design commands, through the software application design interface, from the user device. Further, the processing device may be configured for generating an executable statechart design based on the plurality of design commands. Further, the storage device may be configured for storing the at least one executable statechart design.

20 Claims, 24 Drawing Sheets

New Transition Table Based Approach involves a dynamic table of STATE MACHINES and integer to index handler functions that gets updated every time step Time Step 0:

|      | SM0 | SM1 | SM2 | SM3 | SM4 | SM5 |
|------|-----|-----|-----|-----|-----|-----|
| ev0  | 2   | -   | -   | 2   | -   | -   |

Time Step 1:

|      | SM0 | SM1 | SM2 | SM3 | SM4 | SM5 |
|------|-----|-----|-----|-----|-----|-----|
| ev0  | -   | 1   | -   | 2   | -   | 2   |
| ev1  | 3   | 6   | -   | -   | -   | 3   |

Time Step 2:

|      | SM1 | SM2 | SM3 | SM4 | SM5 |
|------|-----|-----|-----|-----|-----|
| ev0  | 1   | -   | 2   | 6   | -   |
| ev1  | 3   | -   | 4   | -   | 3   |
| ev2  | -   | -   | -   | 2   | -   |

Time Step 3:

|      | SM0 | SM1 | SM2 | SM3 | SM4 | SM5 |
|------|-----|-----|-----|-----|-----|-----|
| ev0  | -   | -   | -   | -   | -   | -   |
| ev1  | -   | -   | 6   | -   | -   | -   |
| ev2  | -   | -   | -   | 4   | 2   | -   |
| ev3  | 5   | -   | -   | -   | -   | 0   |

Time Step 0, 1, 2, 3 ...

ONLINE PLATFORM FOR FACILITATING THE DEVELOPMENT OF SOFTWARE APPLICATIONS BASED ON AN EXECUTABLE STATECHART

TECHNICAL FIELD

Generally, the present disclosure relates to the field of data processing. More specifically, the present disclosure relates to an online platform for facilitating the development of software applications based on an executable statechart.

BACKGROUND

Best practices for developing software applications may include a practice of developing software applications using software developing architectures. Further, the software developing architectures may include microservice architecture. Further, the microservice architecture may structure the software application as a collection of small autonomous services each running in a separate process, modeled around a business domain.

Existing techniques for developing the software application based on an executable statechart are deficient with regard to several aspects. Many existing frameworks for statechart development are either sold as high-level vendor-specific graphical tools or open-source tools that use a declarative State Chart Extendable Markup Language (SCXML). These tools many times do not support truly parallel execution of statecharts. Further, existing statechart implementations may require that all sub-state machines must be coded and built in the same language and at the time as the main application when it is built. In addition, current technologies do not use executable statechart to develop the software application based on the microservice architecture. Further, current technologies do not use a real-time signal to communicate with the autonomous services of the software application. Furthermore, current technologies do not allow autonomous services based on an executable statechart to be programmed using different programming languages using the same API.

Therefore, there is a need for an improved online platform for facilitating the development of software applications based on an executable statechart that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an online platform for facilitating the development of software applications based on an executable statechart using a microservices architecture, in accordance with some embodiments. Accordingly, the online platform may include a communication device, a processing device, and a storage device. Further, the communication device may be configured for transmitting a software application design interface to a user device. Further, the communication device may be configured for receiving a plurality of design commands, through the software application design interface, from the user device. Further, the processing device may be configured for generating an executable statechart design based on the plurality of design commands.

Further, the executable statechart design may include a plurality of microservices corresponding to a plurality of states of at least one state machine. Further, at least one first microservice may be comprised in a first operating system process and at least one second microservice may be comprised in a second operating system process. Further, a communication between the first operating system process and a second operating system process may be facilitated through a communication channel provided by a POSIX Compliant Operating System (PCOS). Further, the storage device may be configured for storing the at least one executable statechart design.

Further disclosed herein is an online platform for facilitating the development of software applications based on an executable statechart using a microservice architecture, in accordance with some embodiments. Accordingly, the online platform may include a communication device, a processing device, and a storage device. Further, the communication device may be configured for transmitting a software application design interface to a user device. Further, the communication device may be configured for receiving a plurality of design commands, through the software application design interface, from the user device. Further, the plurality of design commands may represent an executable statechart design that may include a plurality of microservices corresponding to a plurality of state machines. Further, at least one first microservice corresponds to a first operating system process and at least one second microservice corresponds to a second operating system process. Further, a communication between the first operating system process and the second operating system process may be implemented as a transition from a first state of a first state machine corresponding to the first microservice to a second state of a second state machine corresponding to the second microservice. Further, the transition may be based on at least one event received from a POSIX Compliant Operating System (PCOS) queue. Further, the at least one event may include a POSIX real-time signal. Further, the processing device may be configured for generating the software application design interface. Further, the storage device may be configured for storing the executable statechart design.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 14 is a schematic of a dynamic transition table of a statechart based on microservice architecture for the POSIX compliant operating system, in accordance with some embodiments.

DETAILED DESCRIPTION

Figure 1:
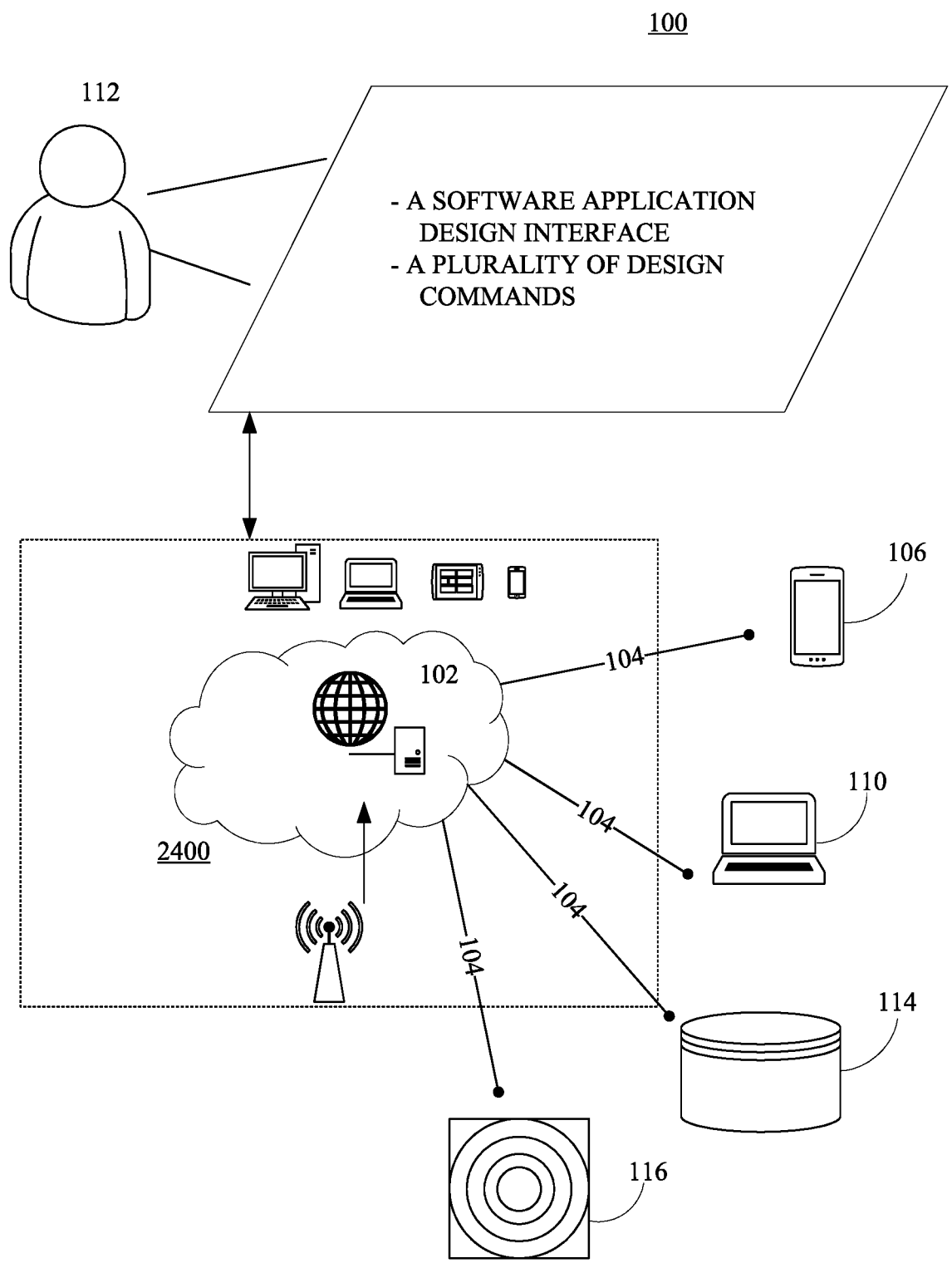
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an online platform for facilitating the development of software application based on an executable statechart, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes an online platform for facilitating the development of software applications based on an executable statechart. Further, the software application may be developed using a microservice architectural style. Further, the microservice architectural style may be an approach for developing a single application as a suite of small services, each running in its own process and communicating using lightweight mechanisms. Further, the suite of small services may be built around business capabilities and independently deployable by fully automated deployment machinery. There may be a bare minimum of centralized management of the suite of small services, which may be written in different programming languages and use different data storage technologies. Further, the suite of small services may be independently deployable and scalable, each service of the suite of small services may also provide a firm module boundary and even allowing for different services to be written in different programming languages. Further, each service may also be managed by different teams.

Further, the present disclosure may use a statechart for developing the software applications based on a microservice architecture for Portable Operating System Interface (POSIX) compliant operating system. Further, a statechart framework using a microservice architecture may include a fundamental extendable building block. Further, the fundamental extendable building block may include an extendable statechart running a process. Further, a business logic associated with the statechart at the application programming level may be programming language-agnostic. Further, the business logic may be programmed in any language that may include an Application Programming Interface (API) to control the statechart using a C Foreign Function Interface (CFFI). Further, the programming language may include C, C++, Python, JAVA, Kotlin, etc. Further, the statechart execution functionality may be imported as a single shared library used as an API. Further, the shared library may include an external C library. Further, the statechart may include a state machine framework. Further, the state machine framework may be driven by synchronous events. Further, the state machine framework may map asynchronous events to synchronous state handlers of state machines. Further, the state machine framework may include a state machine sequencer, a state management engine, etc. Further, the state machine framework may execute an operating system (OS) level construct using a queue management command. Further, the queue management command may include at least one sigtimedwait command and at least one sigqueue command. Further, the sigtimedwait command may include event loop, event dispatching, and event queue. Further, the state machine framework may execute on the OS level construct using POSIX real-time signals. Further, low-level internal handling of state machines may include state machine indexing. Further, the state machine indexing may include indexing of individual states as integers. Further, the state machine framework may use POSIX real-time signals as an event carrying signals that can carry EITHER an integer OR a pointer both locally and between processes. Further, integers on the real number line as applied to this framework provide a somewhat intuitive meaning to some statechart semantics.

Further, the present disclosure may support both queued and threaded event handing models (state transitions) associated with the statechart. Further, the present disclosure may support statechart/Unified Modeling Language (UML) features such as hierarchy, entry and exit handlers, orthogonal regions, history, etc. Further, the present disclosure may facilitate renaming of formal state machine or statechart semantics to informal state machine or statechart semantics at the language level. Further, the present disclosure may facilitate the removal of the need for "if-else"/"case" statements for handling states. Further, the present disclosure may support a primary application attaching to pre-built executable state machines as microservices in a separate process. Further, the pre-built executables may be built from a different programming language than that of the primary application.

Further, the present disclosure may use POSIX real-time signals for event notification between processes for the statechart based on the microservice architecture. Further, the POSIX real-time signal may be queued by the OS. Further, the POSIX real-time signal may have the OS support for a priority order. Further, the POSIX real-time signal may naturally traverse process boundaries. Further, the sigtimedwait command associated with POSIX API may have fundamental behavior of executing based on time.

Further, the present disclosure may include a dynamic two dimensional (2D) transition table associating state machines with events. Further, the present disclosure may include state machines that may be updated at every event step. Further, the present disclosure may include statechart semantics. Further, the statechart semantics may provide an ability to hold sub-state machines active in multiple states of a higher level state machine. Further, the present disclosure may provide each state machine with access to an additional thread when operated in a threaded mode of execution which differs from the process's main thread when operated in a queued mode of execution. Further, the present disclosure may facilitate linear indexing of state machines to ease the finding of the Least Common Ancestor (LCA) state machine, direct parent state machines, etc. Further, the present disclosure may include a single shared library. Further, the single shared library may remove external dependencies except for the target platform. Further, the present disclosure may support a primary application attaching to pre-built executable state machines as microservices. Further, the present disclosure may include a mapping of asynchronous events (epoll) to synchronous handling (sigtimedwait). Further, the present disclosure may provide a multiplexed timer for handing all state machines timer events within a process with a single timer. Further, the present disclosure may include software execution timer compensation which adjusts the time event to account for the latency of the business domain logic execution time. Further, the present disclosure may provide a single platform cross-language model, where multiple languages target a single hardware platform using a CFFI API compared to a Java model, where a single language targets multiple hardware platforms. Further, the present disclosure may provide OS support on UNIX, Linux, Android, etc.

Further, the present disclosure may be facilitated using a microservice-based statechart implementation. Further, in the microservice-based statechart implementation, statechart implementation may be written in "C/C++" programming language and built into a shared library with an exported API. Further, any language capable of providing a callable function object to the library can use the statechart execution framework. Further, in the microservice-based statechart implementation, event loop, event dispatching, and event queue may be built on Operating System POSIX compliant constructs sigqueue( ) and sigtimedwait( ). Further, in the microservice-based statechart implementations, parallel execution may be performed either co-operatively by multiple state machines operating in the same process spawning additional threads from the main thread or 100% parallel at the forked process level. Further, in the microservice-based statechart implementation, hierarchical state machines can be achieved by attaching sub-state machines to parent state machines as a child process. Further, sub-statemachine execution can be controlled by parent state machines by POSIX real time signal. This allows state machines to be built and executed autonomously with no knowledge that the built state machine will be ever used in another state machines hierarchy. Further, any programming language that can build an executable state machine using the framework API and shared library may be used to create sub-state machines that can be used with other programming language using the framework API and shared library.

Further, the present disclosure may facilitate graphical user interface (UI) development. Further, the present disclosure may facilitate robotics software development. Further, the present disclosure may provide a backend or an alternative to graphical statechart based tools. Further, the present disclosure may facilitate game engine development. Further, the present disclosure may facilitate industrial control applications. Further, the present disclosure may facilitate system identification. Further, the present disclosure may facilitate general programming practice such as relationship to object-oriented programming (OOP). Further, the present disclosure may allow programmers to utilize a single statechart implementation for a framework and incorporate application business logic in any programming language which supports a C-Foreign Function Interface (CFFI).

Further, the present disclosure may allow for statecharts to be designed and controlled across a process boundary. Further, child state machines can be designed and tested autonomously, built into an executable and then utilized by any other state machine as a subprocess.

Further, the present disclosure may facilitate statechart implementation. Further, the statechart implementation may be written in "C/C++" programming language and use operating system constructs and may be built on top of POSIX real-time signals. Further, the statechart implementation may use real-time signals for communicating events that allow for a unified treatment of events, whether the events occur in a single process or across multiple processes. Real-time signals may be queued by the operating system and have priority order which may be used to an advantage in the statechart implementation. Further, the POSIX real-time signals may only transfer a number of bytes equal to the size of an integer (4 bytes on a 32 bit OS) and may be generally looked at as a rudimentary form of inter-process communication (IPC) used to only inform a program of hardware changes. Further, the size of the integer may be associated with the POSIX compliant operating system. Further, the POSIX compliant operating system may include a 32-bit operating system, a 64-bit operating system, a 16-bit operating system, etc. Further, the size of integer for the 32-bit operating system may be 4 bytes. Further, the integer sized payload may be enough for the framework to address a state machine and a state. Further, half of the bytes of the payload addressing the state machine and the other half of the bytes addressing the state. Further, considering the limited payload, both state machines and states may be given integer values. Further, statechart semantics may be handled through clever use of the number line. Further, concrete states may be assigned to non-negative values and pseudo-states to negative values. Further, the implementation may be built into a shared library that may be called by any programming language that supports calling a CFFI interface.

Further, the present disclosure may involve a clever mapping of state machines, states, and handler functions to integers and those integers may be used as the payload for POSIX real-time signal communication. Further, the time event may be handled by an event loop that waits for signals with a single multiplexed timer for handing for all state machine timer events. Further, as long as the state machine with the smallest time out value is used on every iteration of the loop, the loop can service all state machines. At every loop iteration, the time before expiration is re-calculated for every machine. This allows for all state machines in a process to share a single timer. Further, a dynamic transition table of events vs state machines may be updated every time the event loop executes.

FIG. 1 is an illustration of an online platform 100 consistent with various embodiments of the present disclosure. By way of non-limiting example, the online platform 100 to facilitate the development of software application based on an executable statechart may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 2400.

Figure 2:
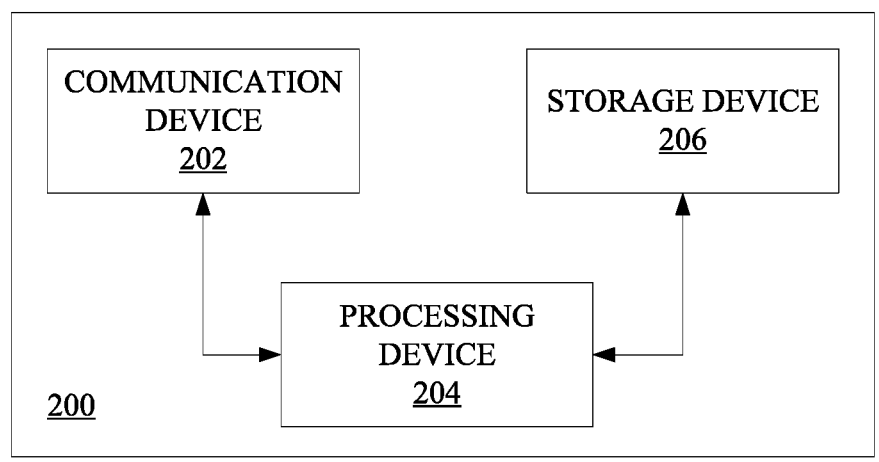
FIG. 2 is a block diagram of an online platform for facilitating the development of software applications based on an executable statechart, in accordance with some embodiments.

FIG. 2 is a block diagram of an online platform 200 for facilitating the development of software applications based on an executable statechart, in accordance with some embodiments. Accordingly, the online platform 200 may include a communication device 202, a processing device 204, and a storage device 206.

Further, the communication device 202 may be configured for transmitting a software application design interface to a user device. Further, the communication device 202 may be configured for receiving a plurality of design commands, through the software application design interface, from the user device. Further, the user device may be associated with at least one user (such as user 112). Further, the user device may include a computing device such as but not limited to a smartphone, a smartwatch, a laptop, a desktop, and so on. Further, the at least one user may include an individual, an institution, an organization, etc. that may want to develop the software application.

Further, the processing device 204 may be configured for generating an executable statechart design based on the plurality of design commands. Further, the executable statechart design may include a plurality of microservices corresponding to a plurality of states of at least one state machine. Further, at least one first microservice may be comprised in a first operating system process and at least one second microservice may be comprised in a second operating system process. Further, a communication between the first operating system process and a second operating system process may be facilitated through a communication channel provided by a POSIX Compliant Operating System (PCOS).

Further, the storage device 206 may be configured for storing the at least one executable statechart design.

Further, in some embodiments, the executable statechart design may include a plurality of executable statecharts. Further, the plurality of executable statecharts may be implemented using a plurality of programming languages.

Further, in some embodiments, the communication channel may include a light-weight communication channel. Further, the communication channel facilitates the communication using at least one POSIX real-time signal. Further, the at least one POSIX real-time signal represents at least one event associated with the at least one state machine. Further, in an embodiment, the at least one POSIX real-time signal may include a payload. Further, the payload may be characterized by a length of bytes associated with the POSIX Compliant Operating System. Further, the POSIX Compliant Operating System may include a 16-bit Operating System, a 32-bit Operating System, a 64-bit Operating System, etc. Further, the length of bytes associated with the 32-bit Operating System may be 4 bytes. Further, a first half of the length of bytes represents a state machine of a plurality of state machines. Further, a second half of the length of the bytes represents a state of a plurality of states of the state machine. Further, in an embodiment, the at least one executable statechart design comprises an execution timer configured for managing an execution time for the at least one executable statechart design. Further, the first operating system process may be associated with a time delay. Further, a time stamp associated with at least one event may be adjusted based on the time delay for managing the execution time. Further, in an embodiment, the at least one POSIX real-time signal may include at least one integer. Further, the at least one integer represents at least one event handler function associated with the at least one state machine. Further, in an embodiment, the at least one integer may include at least one non-negative integer corresponding to at least one concrete state of the at least one state machine. Further, the at least one integer may include at least one negative integer corresponding to at least one pseudo state of the at least one state machine.

Further, in some embodiments, the POSIX Compliant Operating System (PCOS) may be associated with at least one POSIX Compliant Operating System construct. Further, the at least one POSIX Compliant Operating System construct may be based on a threaded event handling model.

Further, in some embodiments, the POSIX Compliant Operating System (PCOS) may be associated with at least one POSIX Compliant Operating System construct. Further, the at least one POSIX Compliant Operating System construct may be based on a queued event handling model.

Further, in some embodiments, the POSIX Compliant Operating System (PCOS) may be associated with at least one POSIX Compliant Operating System construct. Further, the at least one POSIX Compliant Operating System construct may include a queue management command. Further, the queue management command may include at least one of a sigqueue command and a sigtimedwait command.

Further, in some embodiments, the executable statechart design may include at least one hierarchal executable statechart. Further, the least one hierarchal executable statechart may include at least one parent executable statechart and a child executable statechart. Further, in an embodiment, the at least one parent executable statechart may be implemented using a first programming language and the at least one child executable statechart may be implemented using a second programming language disparate from the first programming language.

In further embodiments, a dynamic transition table may be associated with the at least one state machine. Further, the dynamic transition table may include a mapping of a plurality of integers representing a plurality of event handler functions with a plurality of tuples. Further, each tuple may include an index corresponding to an executable statechart and an event identifier. Further, the dynamic transition table may be configured to be updated periodically.

Further, in some embodiments, the POSIX Compliant Operating System may include a plurality of POSIX compliant queues. Further, he POSIX compliant Operating Systems may include a communication channel between the plurality of POSIX compliant queues. In further embodiments, a hardware device may be configured to transmit control data to a POSIX compliant queue of the plurality of POSIX compliant queues.

Further, in some embodiments, the POSIX Compliant Operating System may include a plurality of event management functions. Further, the plurality of event management functions may be associated with the at least one state machine. Further, the plurality of event management functions may include event looping, event dispatching and event queuing.

Further, each state machine of the at least one state machine may include an index. Further, the each state machine may be indexed using the at least one integer. Further, the each state machine may include the plurality of states. Further, the plurality of states may include at least one concrete state and at least one pseudo state. Further, the at least one concrete state may be indexed using at least one non-negative integer of the at least one integer. Further, the at least one pseudo state may be indexed using at least one negative integer of the at least one integer.

Further, in some embodiments, each state of the plurality states may include a business logic. Further, the business logic may be programmed using a plurality of programming languages. Further, the plurality of programming languages may include a foreign function interface (FFI).

Further, in some embodiments, each state of the plurality states may include a business logic. Further, the business logic may be programmed using a plurality of programming languages. Further, the plurality of programming languages may include a C foreign function interface (CFFI).

Further, a graphical user interface (UI) of a software application may be developed based on the executable statechart design. Further, the software application may be associated with a software architecture associated with an Android operating system. Further, the software architecture may separate the UI from the underlying data. Further, a ViewModel section of the software architecture may provide data required by UI controllers. Further, the data may include activity and fragments. Further, the UI controller may be implemented using a statechart controller with a small footprint. Further, the statechart controller may include an executable statechart.

Further, a robot software may be developed based on the executable statechart design. Further, the development of the robot software may be based on a graphical programming architecture for the programming of robots based on statecharts. Further, many statechart based tools appear in a graphical format or high-level XML declarative languages such as Yakindu, NI Statechart Module, IBM Rhapsody, AmarX, SCXML, and so on. Further, model-based design techniques and graphical programming may be mostly seen as niche and expensive prototyping tools for many developers. Further, the statecharts, which have well-defined execution semantics, need not be always coded with a graphical front end. Further, the high-level robot program using statecharts can be developed in any programming language that can build an executable state machine that supports CFFI.

Further, a game engine may be developed based on the executable statechart design. Further, many game development engines currently use behavior trees over traditional state machines for game engines as the behavior trees may overcome many shortcomings of state machines including parallel execution and state explosion. Further, a behavior tree may be a tree of hierarchical nodes that control the flow of decision making of an artificial intelligence (AI) entity. Further, statecharts were also created in order to overcome some of the shortcomings of traditional state machines including parallel execution and state explosion. Further, a statechart may mimic the behavior of the behavior tree by the use of statechart pseudo states. Further, a game engine developed based on the executable statechart design may offer an alternative to game engines currently developed using behavior trees.

Figure 3:
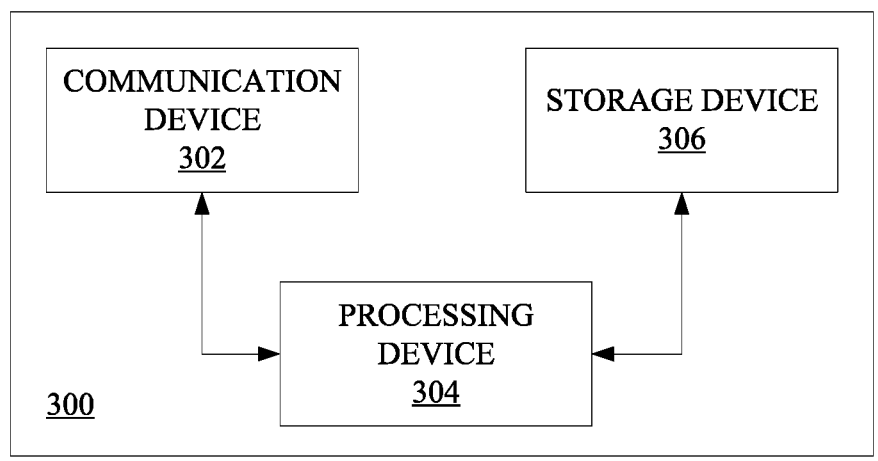
FIG. 3 is a block diagram of an online platform for facilitating the development of software applications based on an executable statechart, in accordance with some embodiments.

Further, a controller design structure may be based on the executable statechart design. In general, controller design may require prior knowledge about the internal structure of the controller and prior knowledge pertaining to hierarchy and partitioning of states. Further, all structural components of the statechart, current state, next state, and events may be mapped to integers. Further, structural hierarchy, number of sub-state machines, and number of states may be handled as integers. Further, an integer optimization problem with constraints may determine the internal structure of the controller design using statecharts. FIG. 3 is a block diagram of an online platform 300 for facilitating the development of software application based on an executable statechart, in accordance with some embodiments. Accordingly, the online platform 300 may include a communication device 302, a processing device 304, and a storage device 306.

Further, the communication device 302 may be configured for transmitting a software application design interface to a user device. Further, the user device may be associated with at least one user (such as user 112). Further, the user device may include a computing device such as but not limited to a smartphone, a smartwatch, a laptop, a desktop, and so on. Further, the at least one user may include an individual, an institution, an organization, etc. that may want to develop the software application. Further, the communication device 302 may be configured for receiving a plurality of design commands, through the software application design interface, from the user device. Further, the plurality of design commands may represent an executable statechart design that may include a plurality of microservices corresponding to a plurality of state machines. Further, at least one first microservice corresponds to a first operating system process and at least one second microservice corresponds to a second operating system process. Further, a communication between the first operating system process and the second operating system process may be implemented as a transition from a first state of a first state machine corresponding to the first microservice to a second state of a second state machine corresponding to the second microservice. Further, the transition may be based on at least one event received from a POSIX Compliant Operating System (PCOS) queue.

Further, the processing device 304 configured for generating the software application design interface.

Further, the storage device 306 configured for storing the executable statechart design.

Further, in some embodiments, the plurality of microservices corresponds to at least one state machine of the plurality of state machines. Further, the communication between the first operating system process and the second operating system process may be implemented as the transition of the at least one state machine from a first state corresponding to the first microservice to a second state corresponding to the second microservice.

Figure 4:
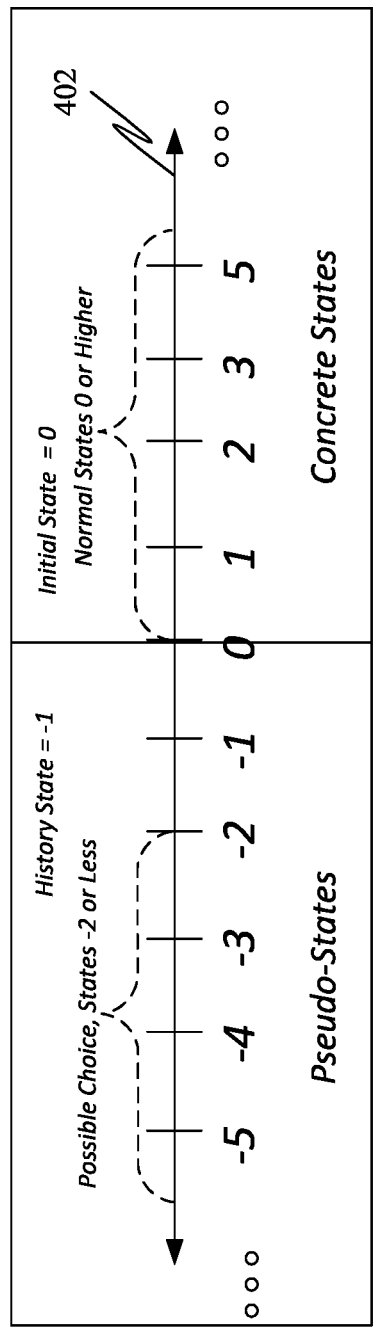
FIG. 4 is an illustration showing indexing of a plurality of states using a number line, in accordance with some embodiments.

FIG. 4 is an illustration showing indexing of a plurality of states using a number line 402, in accordance with some embodiments. Further, the plurality of states may include at least one concrete state and at least one pseudo state. Further, the number line 402 may include at least one non-negative integer and at least one negative integer. Further, the at least one concrete state may be indexed using the at least one non-negative integer. Further, the at least one pseudo state may be indexed using the at least one negative integer.

Figure 5:
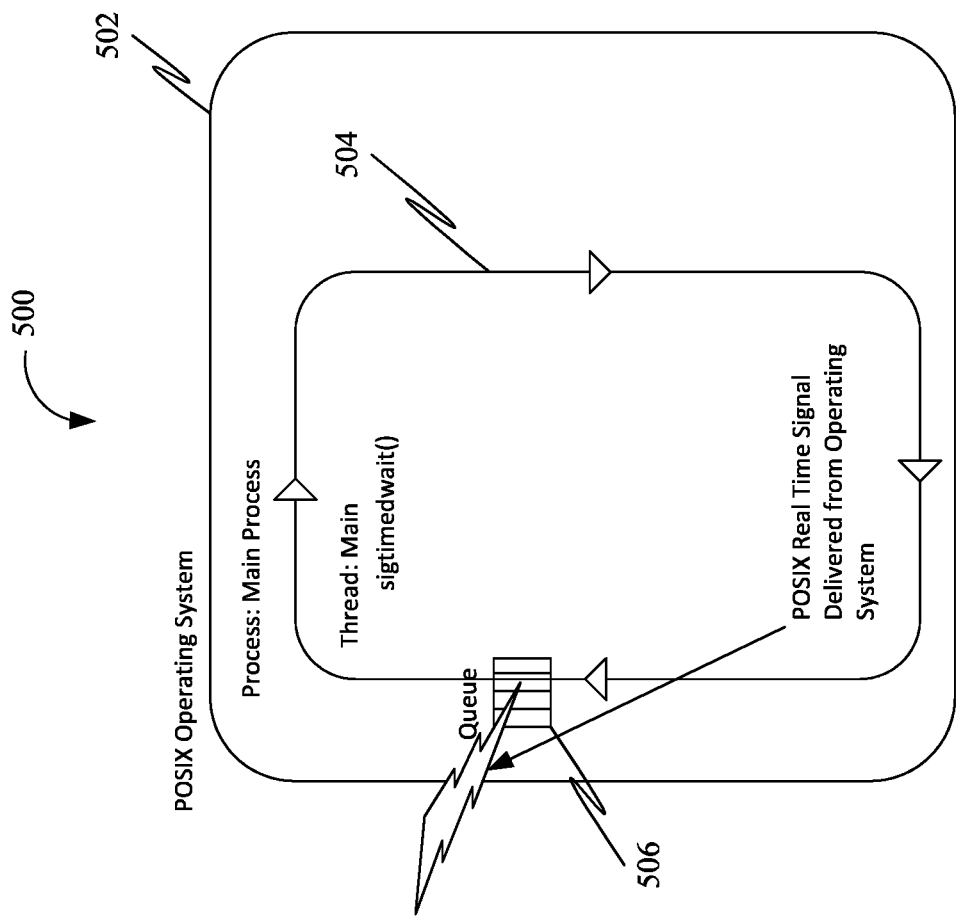
FIG. 5 is a schematic of a microservice architecture for a POSIX compliant operating system configured for handling a single state machine with state behavior executed by the use of a single thread.

FIG. 5 is a schematic of a microservice architecture 500 for a POSIX compliant operating system configured for handling a single state machine with state behavior executed by the use of a single thread. Further, the microservice architecture 500 may include a POSIX operating system. Further, the POSIX operating system may include at least one process. Further, the at least one process may include a first process 502. Further, the at least one process may include at least one thread. Further, the at least one thread may include a first thread 504. Further, the POSIX operating system may include a queue 506. Further, the queue 506 may be configured to schedule the at least one state transition based on at least one event. Further, the queue 506 may queue the at least one event. Further, the at least one event may include at least one POSIX real-time signal.

Figure 6:
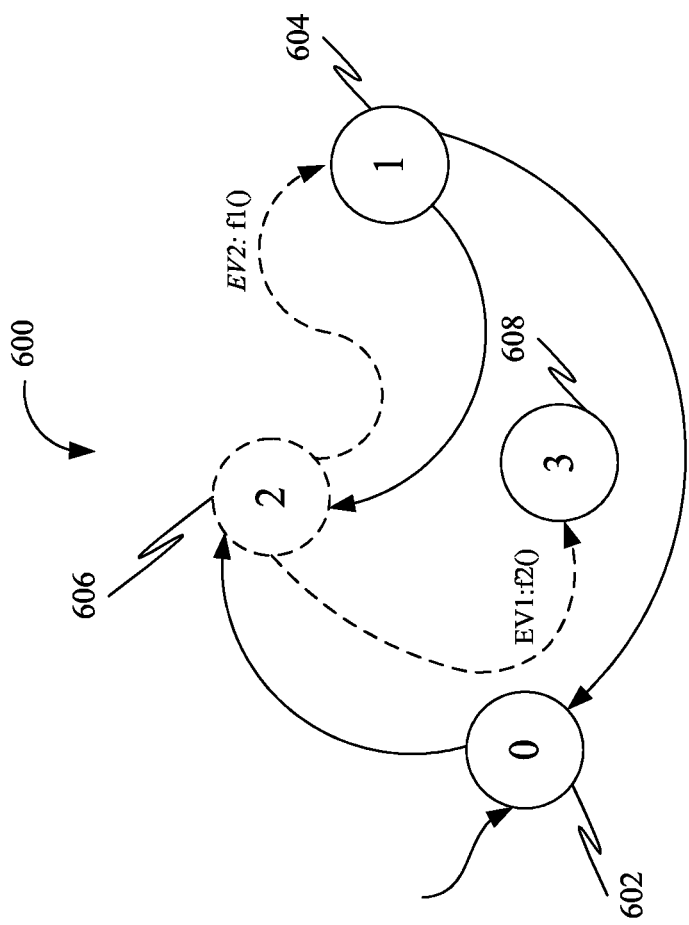
FIG. 6 is a schematic of a statechart of a single state machine, in accordance with some embodiments.

FIG. 6 is a schematic of a statechart of a single state machine 600, in accordance with some embodiments. Further, the single state machine 600 may include a plurality of states 602-608. Further, each state of the plurality of states 602-608 may be indexed using at least one integer. Further, the plurality of states 602-608 may include a first state 602 and a second state 606. Further, a transition from the first state 602 to the second state 606 may be based on at least one event. Further, the at least one event may include the at least one POSIX real-time signal.

Figure 7:
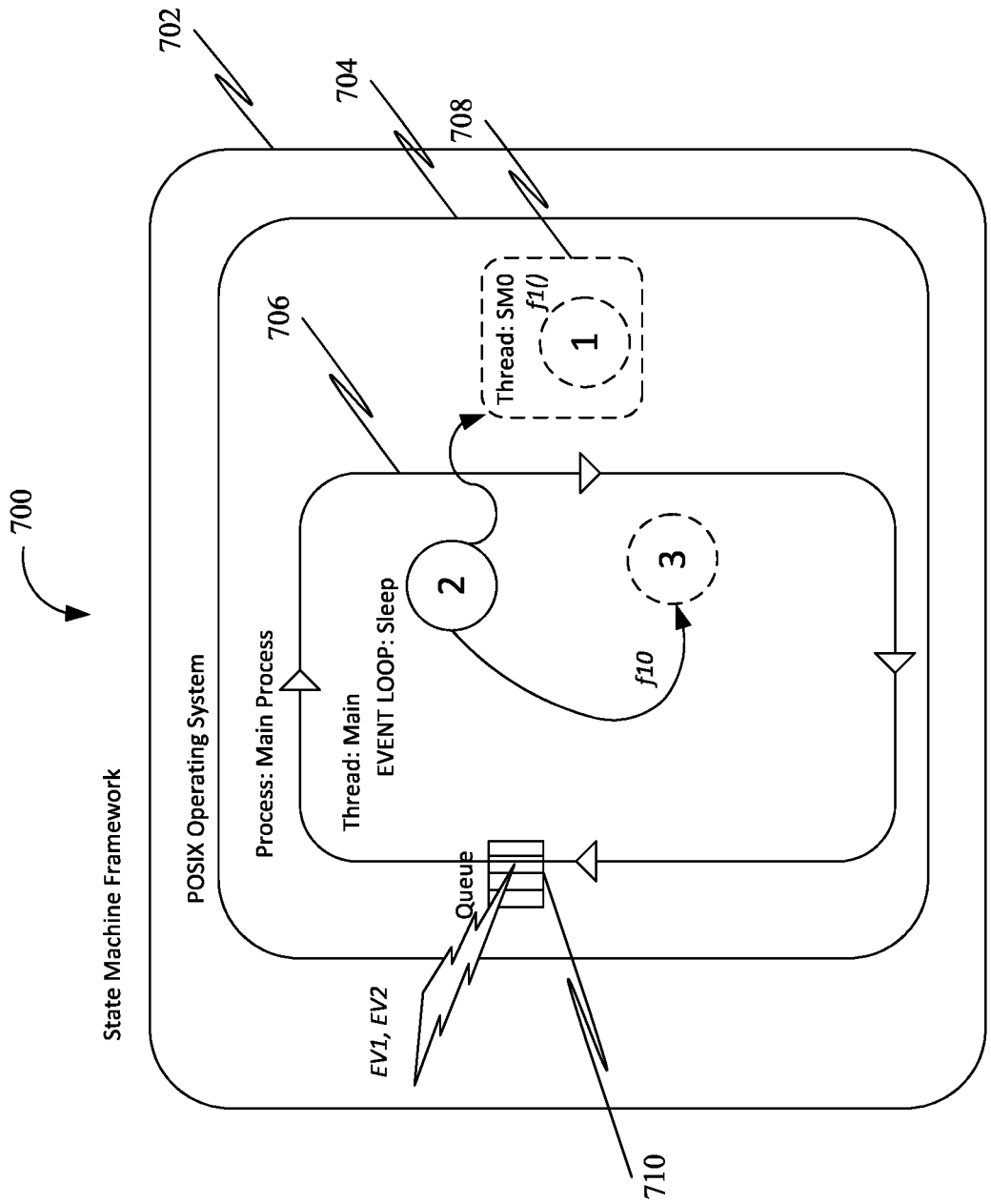
FIG. 7 is a schematic of a microservice architecture for a POSIX compliant operating system configured for handling a single state machine with state behavior executed by the use of multiple threads, in accordance with some embodiments.

FIG. 7 is a schematic of a microservice architecture 700 for a POSIX compliant operating system configured for handling a single state machine with state behavior executed by the use of multiple threads, in accordance with some embodiments. Further, the microservice architecture 700 may include a state machine framework. Further, the microservice architecture 700 may include a POSIX operating system 702. Further, the POSIX operating system 702 may include at least one process. Further, the at least one process may include a first process 704. Further, the first process 704 may include at least one thread. Further, the at least one thread may include a first thread 706 and a second thread 708. Further, the POSIX operating system 702 may include at least one queue associated with the at least one process. Further, the at least one queue may include a first queue 710 associated with the first process 704. Further, the first queue 710 may be configured to schedule the at least one state transition based on at least one event. Further, the first queue 710 may queue the at least one event. Further, the at least one event may include at least one POSIX real-time signal. Further, the at least one process corresponds to at least one microservice. Further, the at least one microservice may include at least one state of the plurality of states. Further, the at least one state may be associated with the single state machine 600, as shown in FIG. 6. Further, the first process 704 may be configured to handle the single state machine 600.

Figure 8:
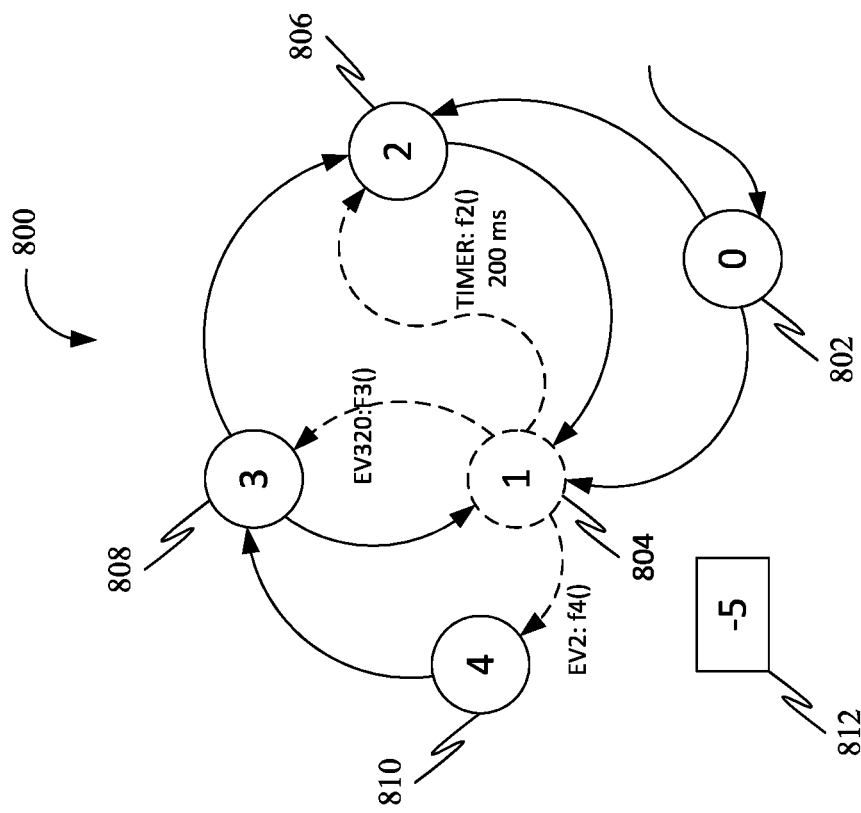
FIG. 8 is a schematic of a statechart of a state machine, in accordance with some embodiments.

FIG. 8 is a schematic of a statechart of a state machine 800, in accordance with some embodiments. Further, the state machine 800 may include a plurality of states 802-812. Further, the plurality of states 802-812 may include at least one concrete state 802-810 and at least one pseudo state 812. Further, the at least one concrete state 802-810 may be indexed using at least one non-negative integer. Further, the at least one pseudo state 812 may be indexed using at least one negative integer.

Figure 9:
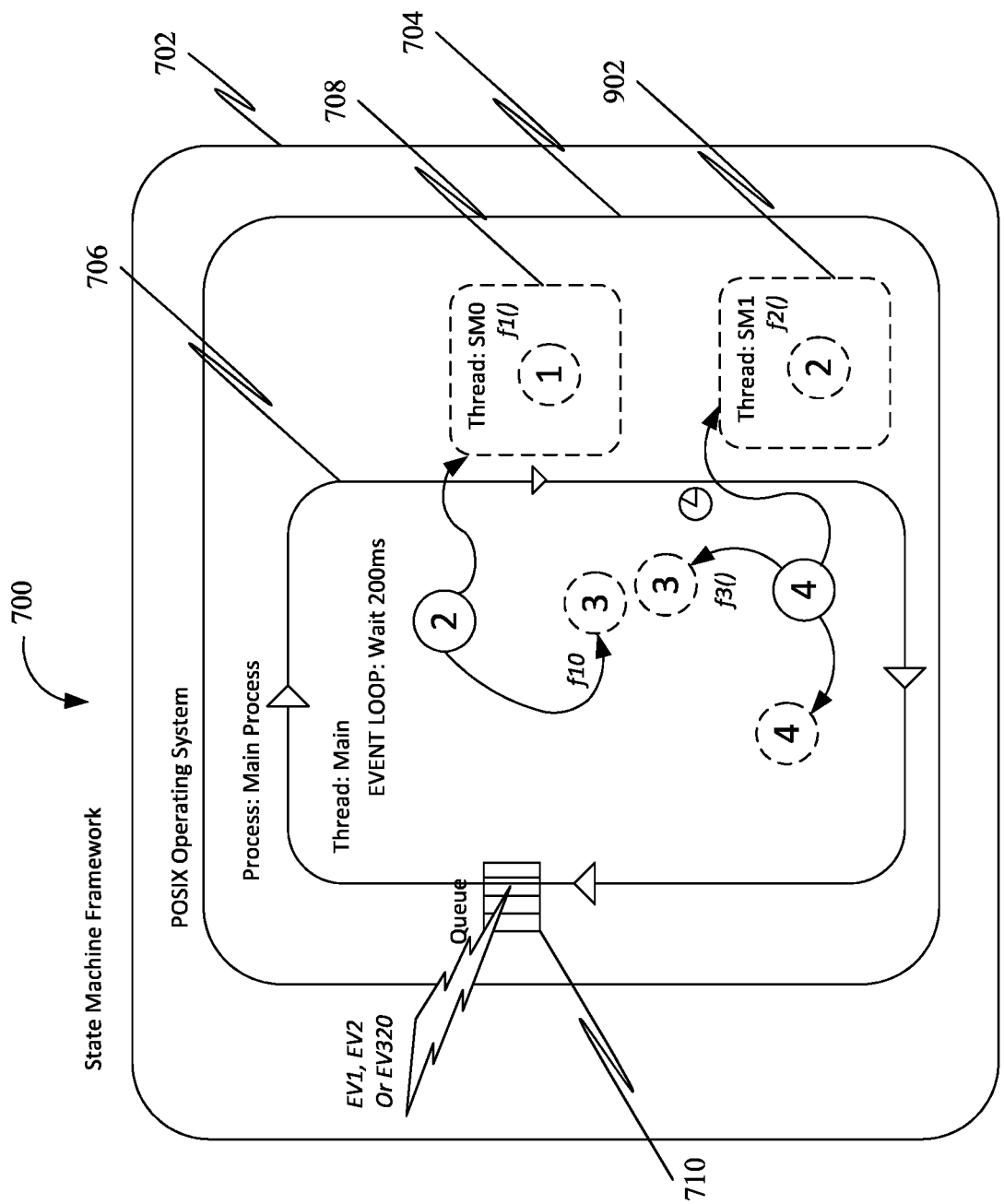
FIG. 9 is a schematic of the microservice architecture for the POSIX compliant operating system configured for handling multiple state machines in a single process with state behavior executed parallelly by the use of multiple threads, in accordance with some embodiments.

FIG. 9 is a schematic of the microservice architecture 700 for the POSIX compliant operating system configured for handling multiple state machines in a single process with state behavior executed parallelly by the use of multiple threads, in accordance with some embodiments. Further, the at least one thread may include the first thread 706, the second thread 708, and a third thread 902. Further, the at least one thread corresponds to the at least one microservice. Further, the at least one microservice may include at least one state of a plurality of states. Further, the plurality of states may be associated with at least one state machine. Further, the at least one state machine may include a first state machine and a second state machine. Further, the first state machine may correspond to the single state machine 600 as shown in FIG. 6. Further, the second state machine may correspond to the state machine 800 as shown in FIG. 8. Further, the first process 704 may be configured to handle the first state machine and the second state machine parallelly.

Figure 10:
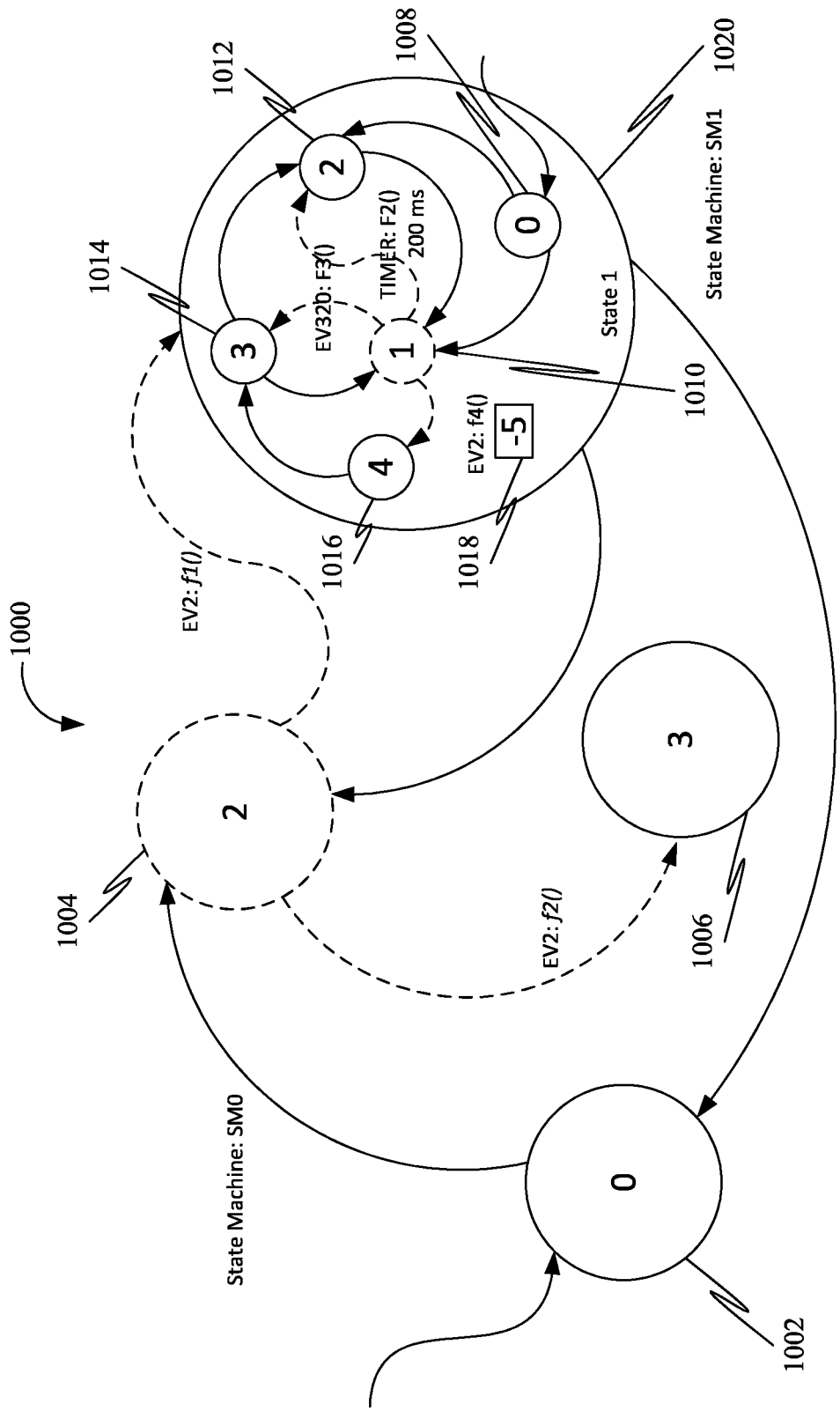
FIG. 10 is a schematic of a statechart of a hierarchical state machine, in accordance with some embodiments.

FIG. 10 is a schematic of a statechart of a hierarchical state machine 1000, in accordance with some embodiments. Further, the hierarchical state machine 1000 may include a plurality of states 1002-1006 and at least one first level state machine 1020. Further, the plurality of states 1002-1006 may include at least one concrete state. Further, the at least one concrete state may be indexed using at least one non-negative integer. Further, the at least one first level state machine may include a plurality of first level states 1008-

1018. Further, the plurality of first level states 1008-1018 may include the at least one concrete state and the at least one pseudo state. Further, the at least one pseudo state may be indexed using at least one negative integer.

Figure 11:
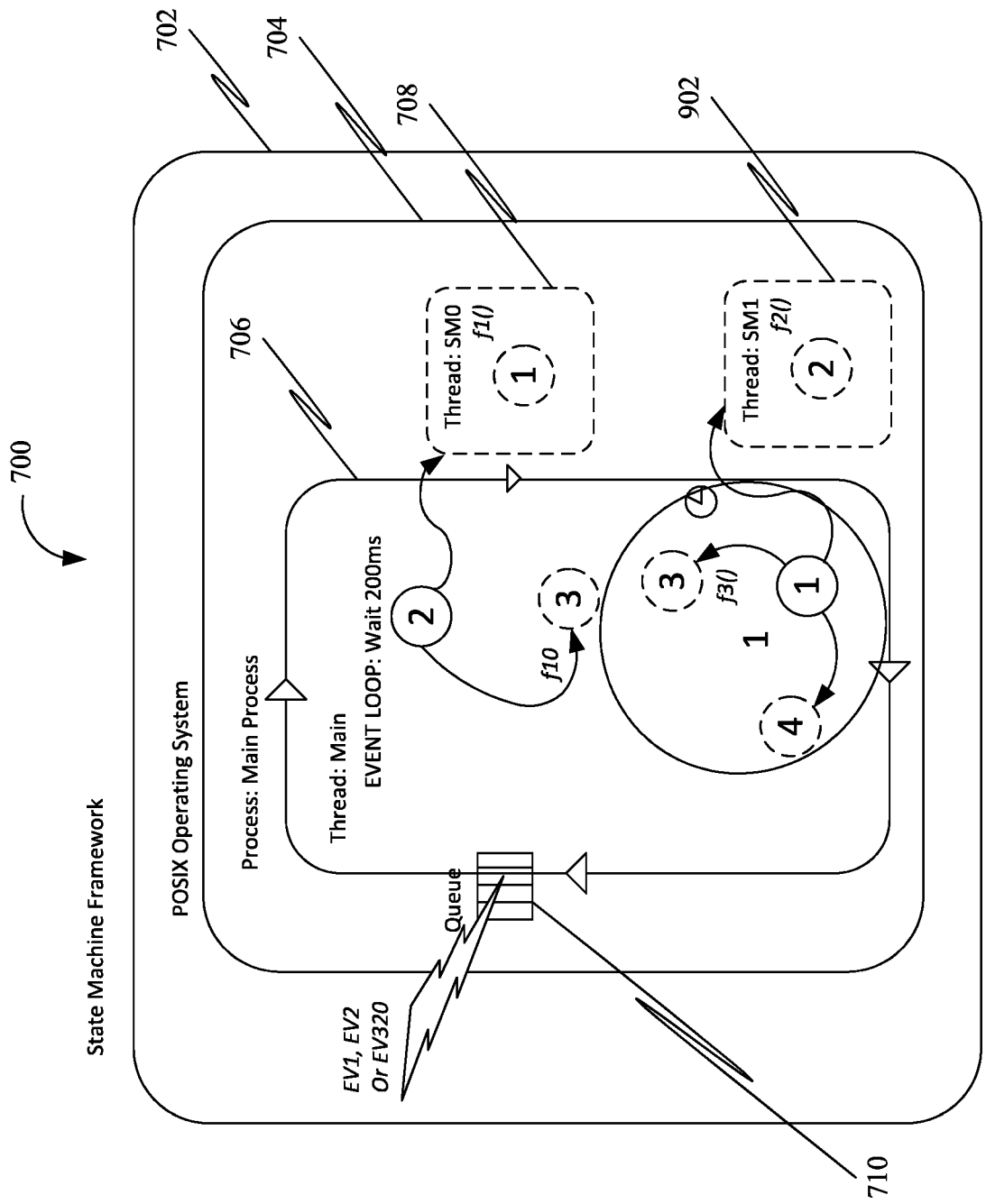
FIG. 11 a schematic of the microservice architecture for the POSIX compliant operating system configured for handling a hierarchical state machine in a single process with state behavior executed parallelly by the use of multiple threads, in accordance with some embodiments.

FIG. 11 a schematic of the microservice architecture 700 for the POSIX compliant operating system configured for handling a hierarchical state machine in a single process with state behavior executed parallelly by the use of multiple threads, in accordance with some embodiments. Further, the at least one thread corresponds to at least one microservice. Further, the at least one microservice may include at least one state of the plurality of states. Further, the plurality of states may be associated with the hierarchical state machine 1000, as shown in FIG. 10. Further, the first process 704 may be configured to handle the hierarchical state machine 1000.

Figure 12:
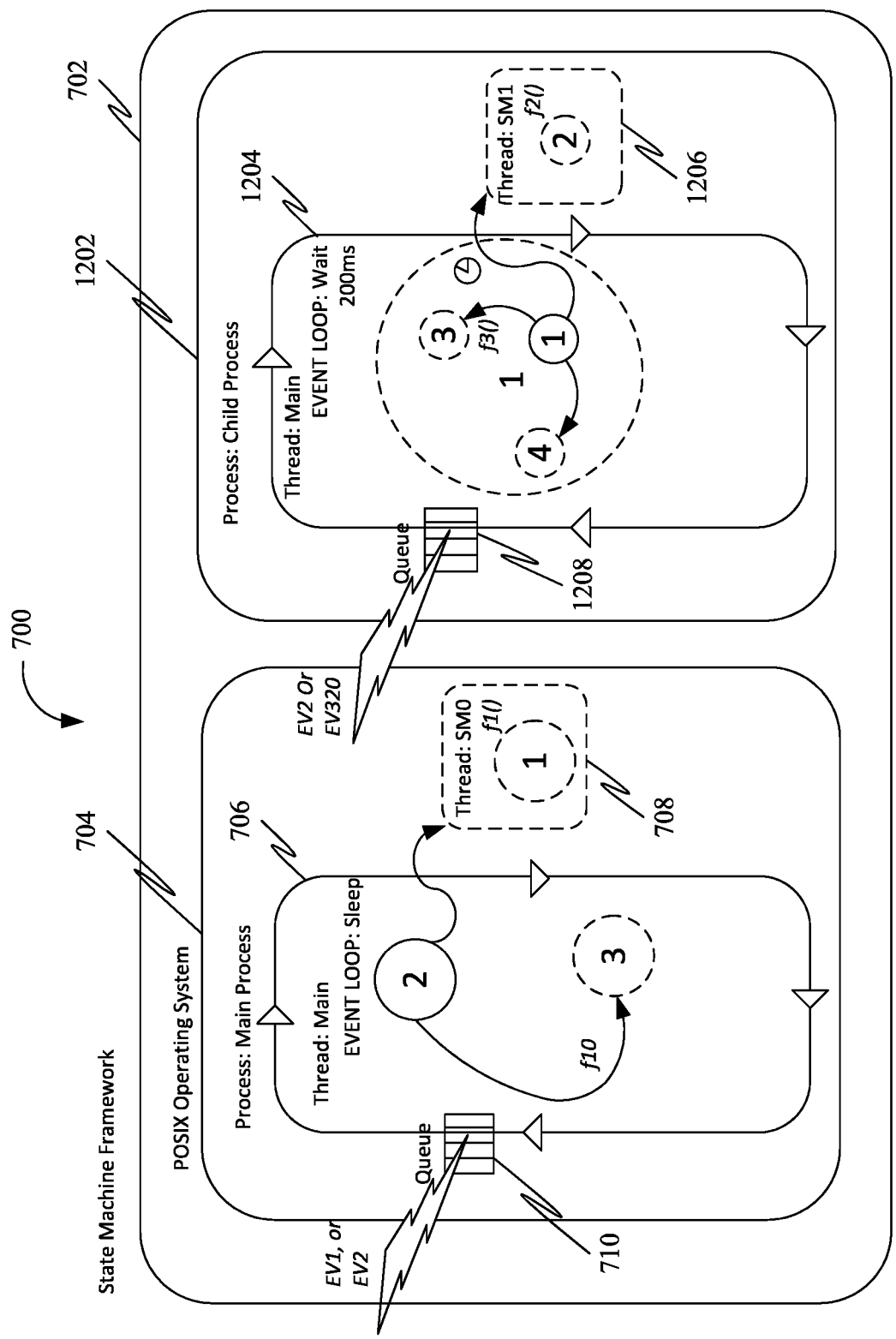
FIG. 12 a schematic of the microservice architecture for the POSIX compliant operating system configured for handling a hierarchical state machine in multiple processes, in accordance with some embodiments.

FIG. 12 a schematic of the microservice architecture 700 for the POSIX compliant operating system configured for handling a hierarchical state machine in multiple processes, in accordance with some embodiments. Further, the at least one process may include the first process 704 and a second process 1202. Further, the second process 1202 may include an alpha thread 1204 and a beta thread 1206. Further, the at least one queue may include the first queue 710 and a second queue 1208. Further, the second queue 1208 may be associated with the second process 1202. Further, the at least one thread may include the first thread 706, the second thread 708, the alpha thread 1204, and the beta thread 1206. Further, the at least one process corresponds to at least one microservice. Further, the at least one microservice may include at least one state of the plurality of states. Further, the plurality of states may be associated with the hierarchical state machine 1000, as shown in FIG. 10. Further, the first process 704 and the second process 1202 may be configured to handle the hierarchical state machine 1000.

Figure 13:
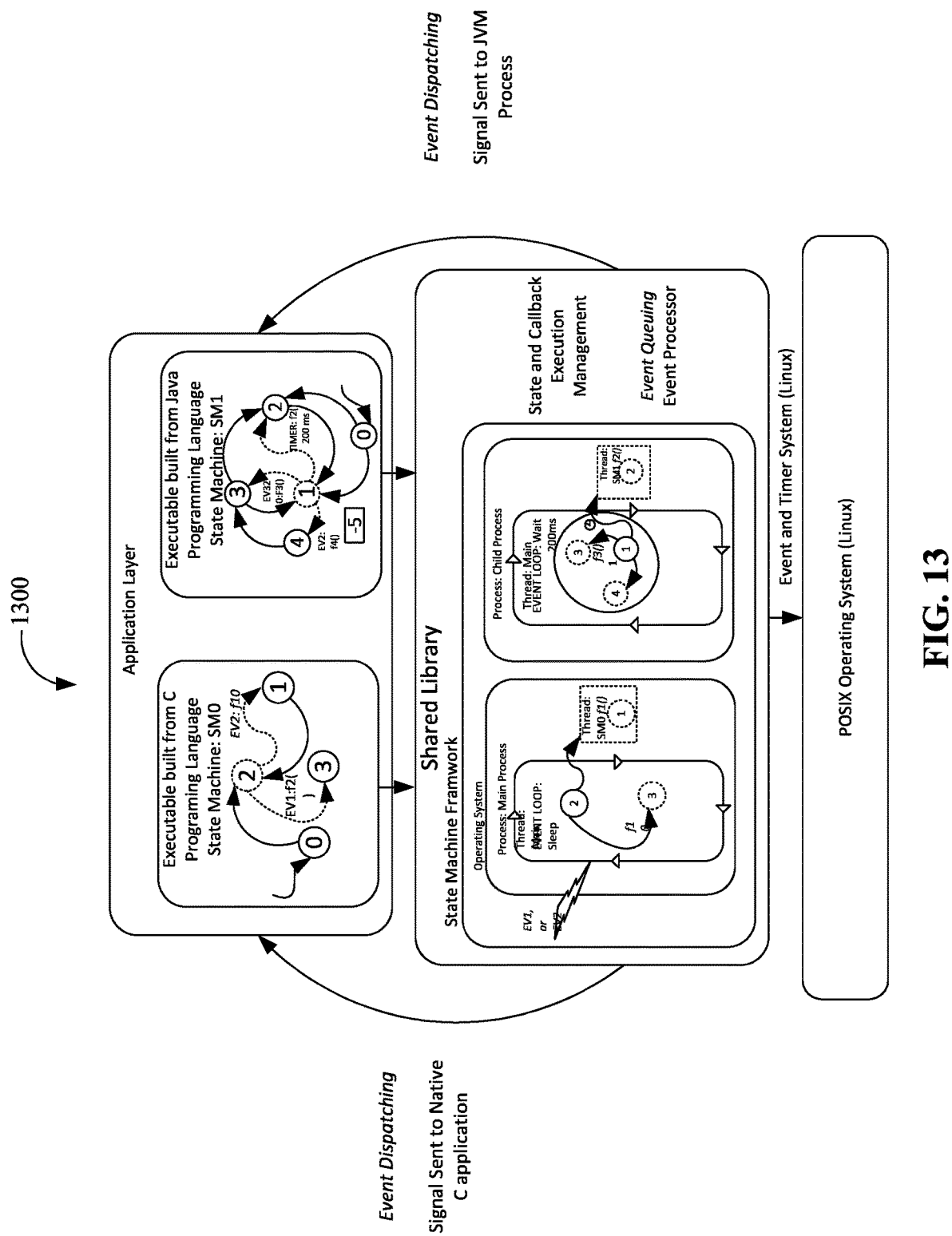
FIG. 13 is a schematic of a microservice architecture of a hierarchical state machine achieving programming language agnostics by use of a single shared library used as an API, in accordance with some embodiments.

FIG. 13 is a schematic of a microservice architecture 1300 of a hierarchical state machine achieving programming language agnostics by use of a single shared library used as an API, in accordance with some embodiments.

FIG. 14 is a schematic of a dynamic transition table 1400 of a statechart based on microservice architecture for the POSIX compliant operating system, in accordance with some embodiments. Further, the dynamic transition table 1400 may include a plurality of state machines and a plurality of integers to index a plurality of handler functions. Further, the plurality of integers may be configured to be updated at every time step. Further, a plurality of columns in the dynamic transition table 1400 may denote the plurality of state machines.

Figure 15:
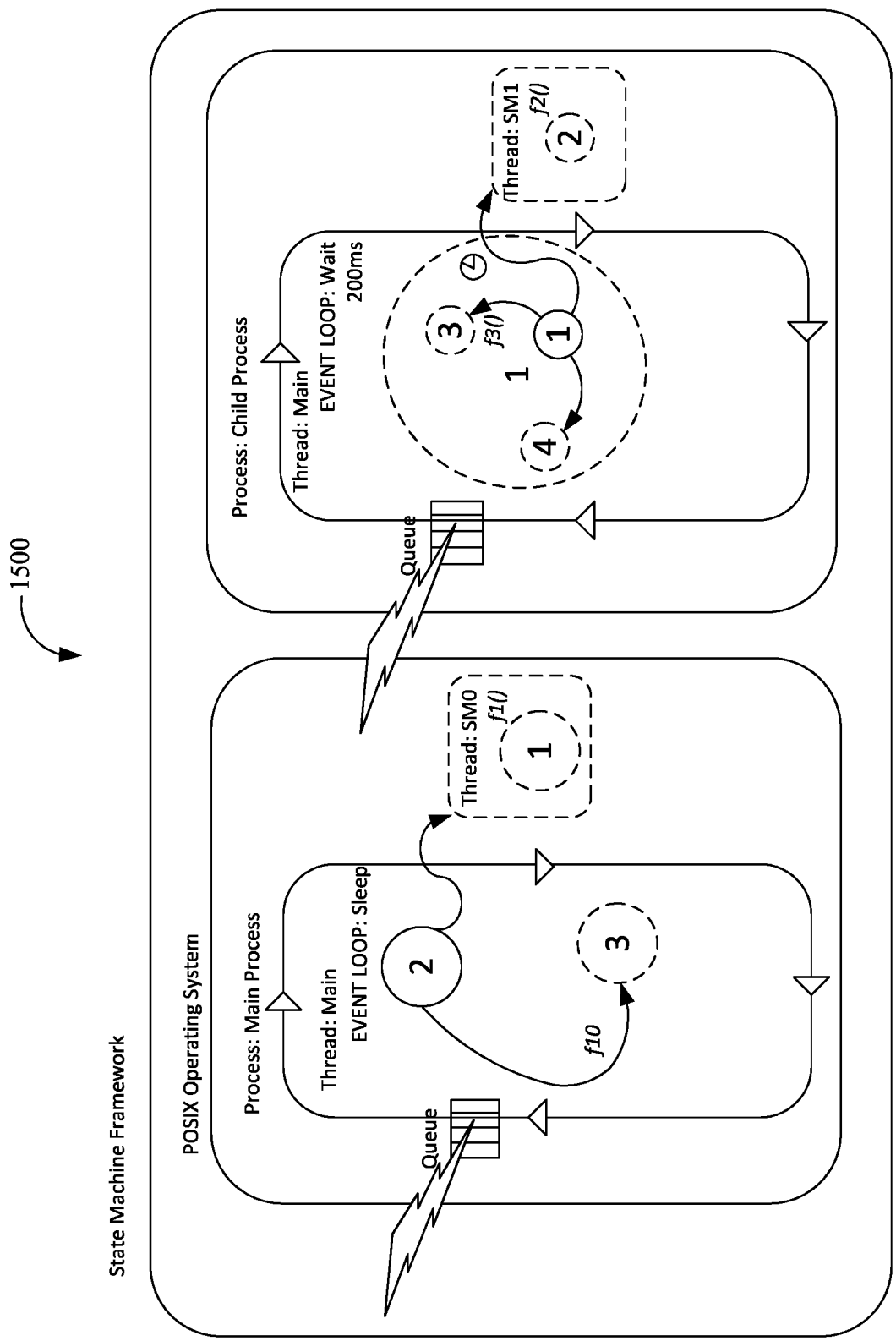
FIG. 15 is a schematic a microservice architecture for POSIX compliant operating systems representing a general case of a multi-process state machine, in accordance with some embodiments.

FIG. 15 is a schematic a microservice architecture 1500 for POSIX compliant operating systems representing a general case of a multi-process state machine, in accordance with some embodiments. Further, in the general case the at least one state machine may be configured as a hierarchical state machine possibly spanning across the process boundary. Further, the at least one state machine may be executed either in single thread or a plurality of threads in each process.

Figure 16:
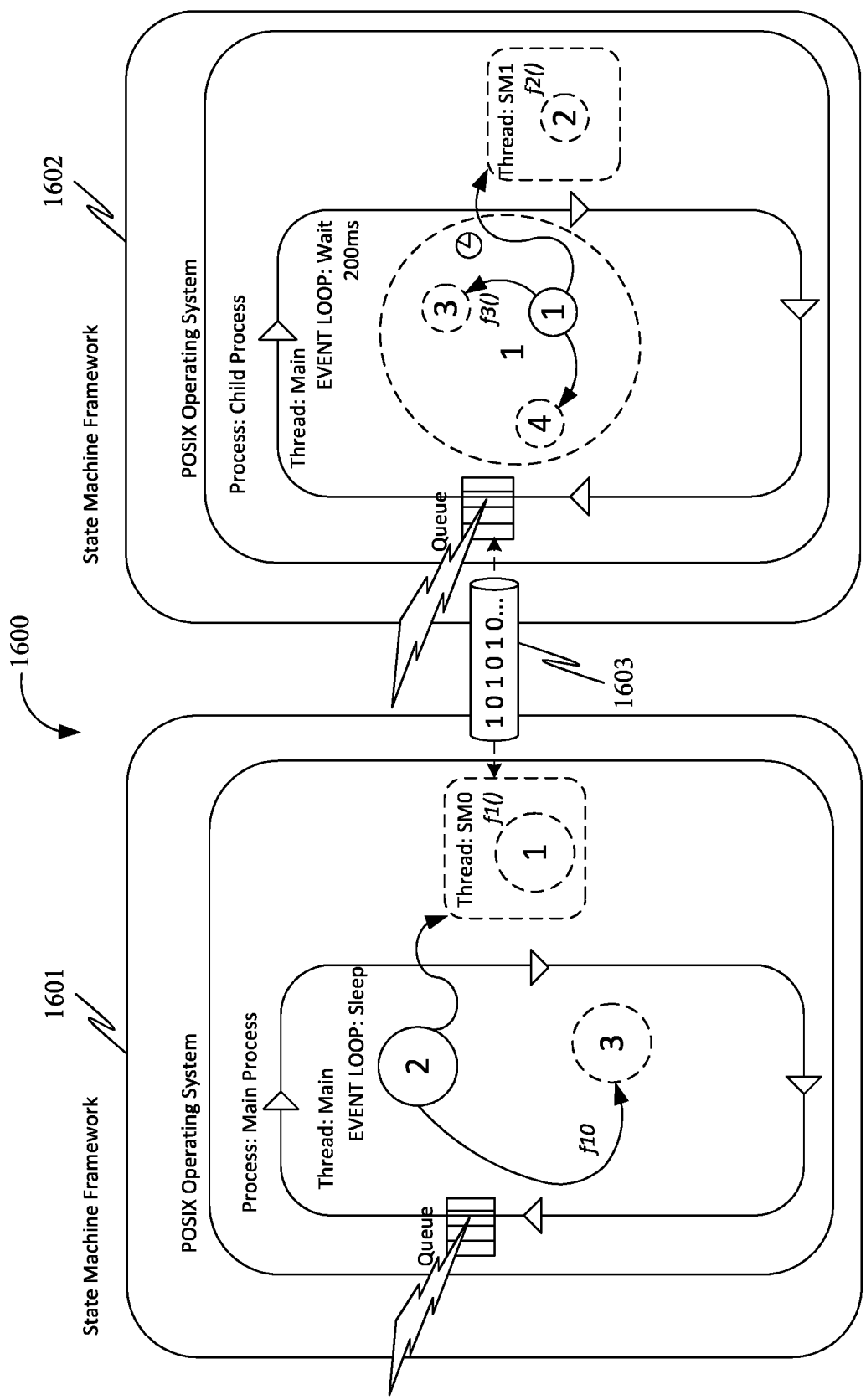
FIG. 16 is a schematic a microservice architecture for POSIX compliant operating systems representing a distributed case of the multi-process state machine, in accordance with some embodiments.

FIG. 16 is a schematic a microservice architecture 1600 for the POSIX compliant operating systems representing a distributed case of the multi-process state machine, in accordance with some embodiments. Further, in the distributed case the at least one state machine may be handled by a plurality of processes corresponding to the POSIX compliant operating systems. Further, in the distributed case, each POSIX compliant operating system need not reside on the same machine and may be connected by a network. Further, a first POSIX compliant operating system 1601 may include at least one first process. Further, the at least one first process corresponds to at least one first microservice. Further, the first POSIX compliant operating system 1601 may use a reliable bidirectional communication channel 1603 configured for sending control data to a second POSIX compliant operating system 1602. Further, the second POSIX compliant operating system 1602 may include at least one second process. Further, the at least one second process corresponds to at least one second microservice. Further, the at least one first microservice and the at least one second microservice may include at least one state of the plurality of states. Further, the control data sent from the first POSIX compliant operating system 1601 to the second POSIX compliant operating system 1602 may represent at least one event. Further, the at least one event may include a mapping from the control data to at least one POSIX real-time signal.

Figure 17:
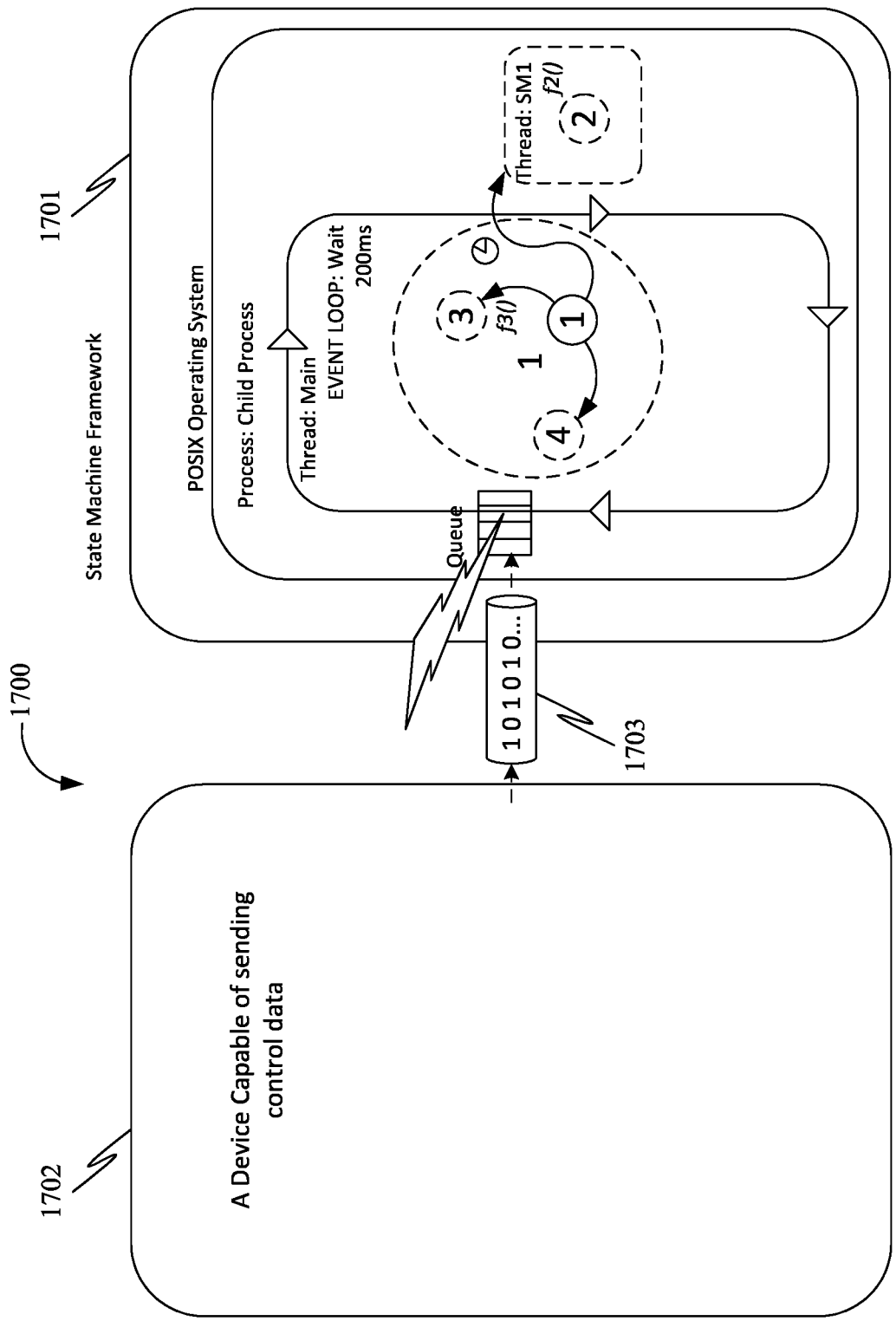
FIG. 17 is a schematic of a microservice architecture for the POSIX compliant operating systems representing a variant case of on open-loop control, in accordance with some embodiments.

FIG. 17 is a schematic of a microservice architecture 1700 for the POSIX compliant operating systems representing a variant case of open-loop control, in accordance with some embodiments. Further, in the variant case of open-loop control, the microservice architecture is being controlled by a device 1702 that may not be the POSIX compliant operating systems. Further, the device 1702 may be configured for sending control data to a POSIX operating system 1701. Further, the device 1702 may use a reliable unidirectional communication channel 1703 configured for sending control data to the POSIX compliant operating system 1701. Further, the control data may represent at least one event. Further, the at least one event may include a mapping from the control data to at least one POSIX real-time signal.

Figure 18:
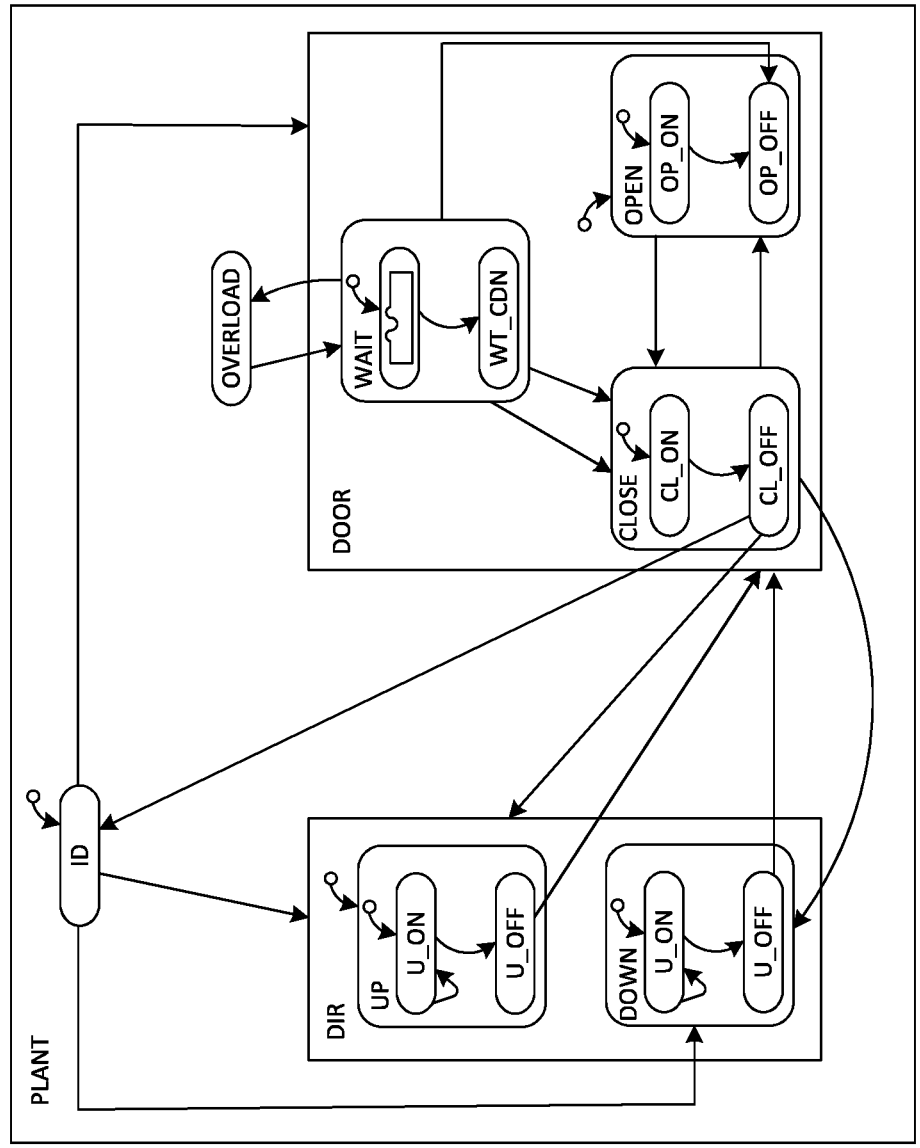
FIG. 18 is a schematic of a statechart used to model a plant, in accordance with some embodiments.

FIG. 18 is a schematic of a statechart used to model a plant 1800, in accordance with some embodiments. Further, the statechart of the plant 1800 may be used as an example in subsequent figures for illustration of the statechart in enumerated representation and partitioned representation for a microservice architecture.

Figure 19:
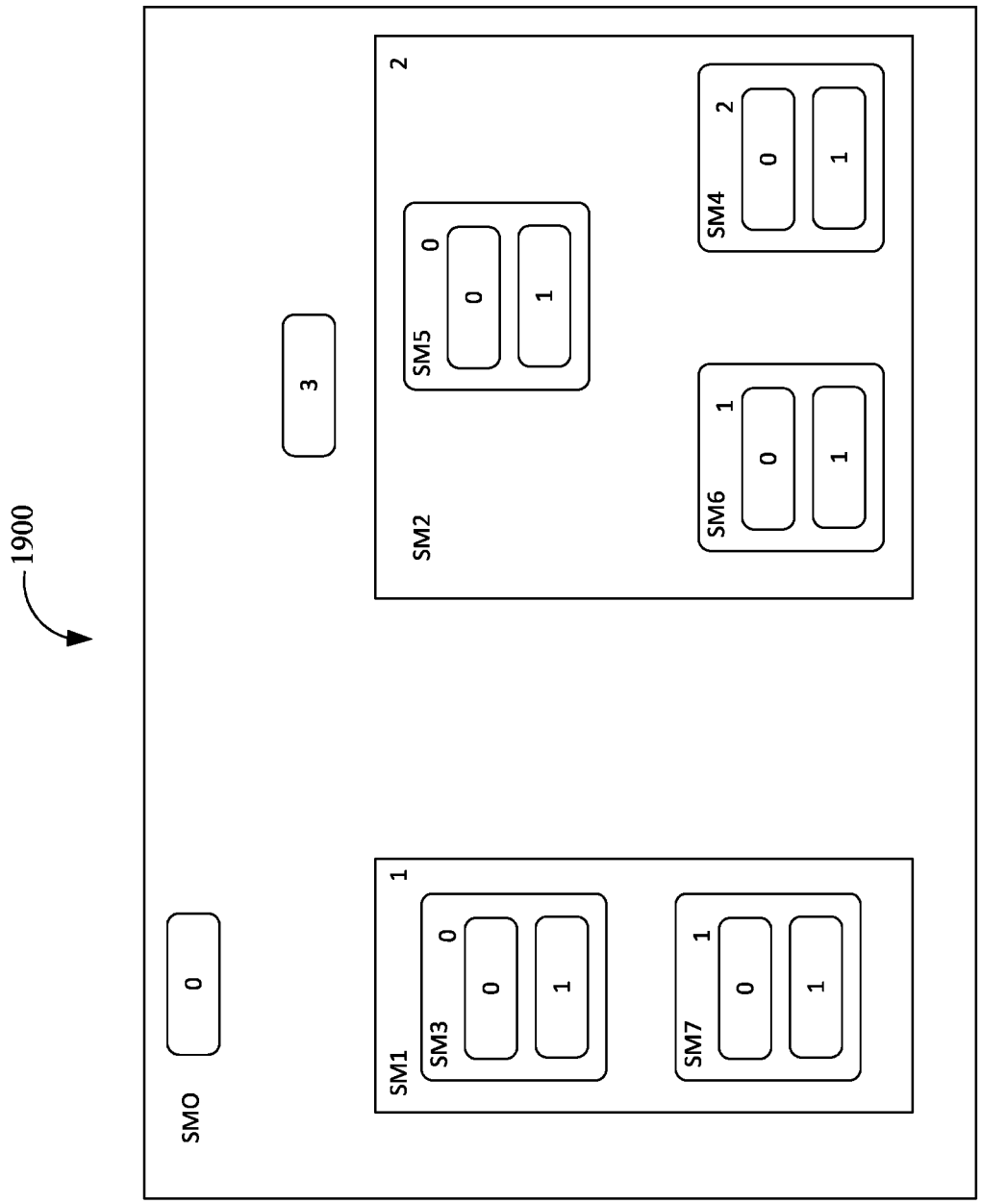
FIG. 19 is a schematic of an enumerated representation of state machines corresponding to the plant, in accordance with some embodiments.

FIG. 19 is a schematic of an enumerated representation of state machines 1900 corresponding to the plant 1800, in accordance with some embodiments. Further, the plurality of plant processes may correspond to a plurality of state machines. Further, the plurality of state machines may be enumerated using the at least one integer. Further, each state machine may include at least one state. Further, the at least one state may be enumerated using the at least one integer.

Figure 20:
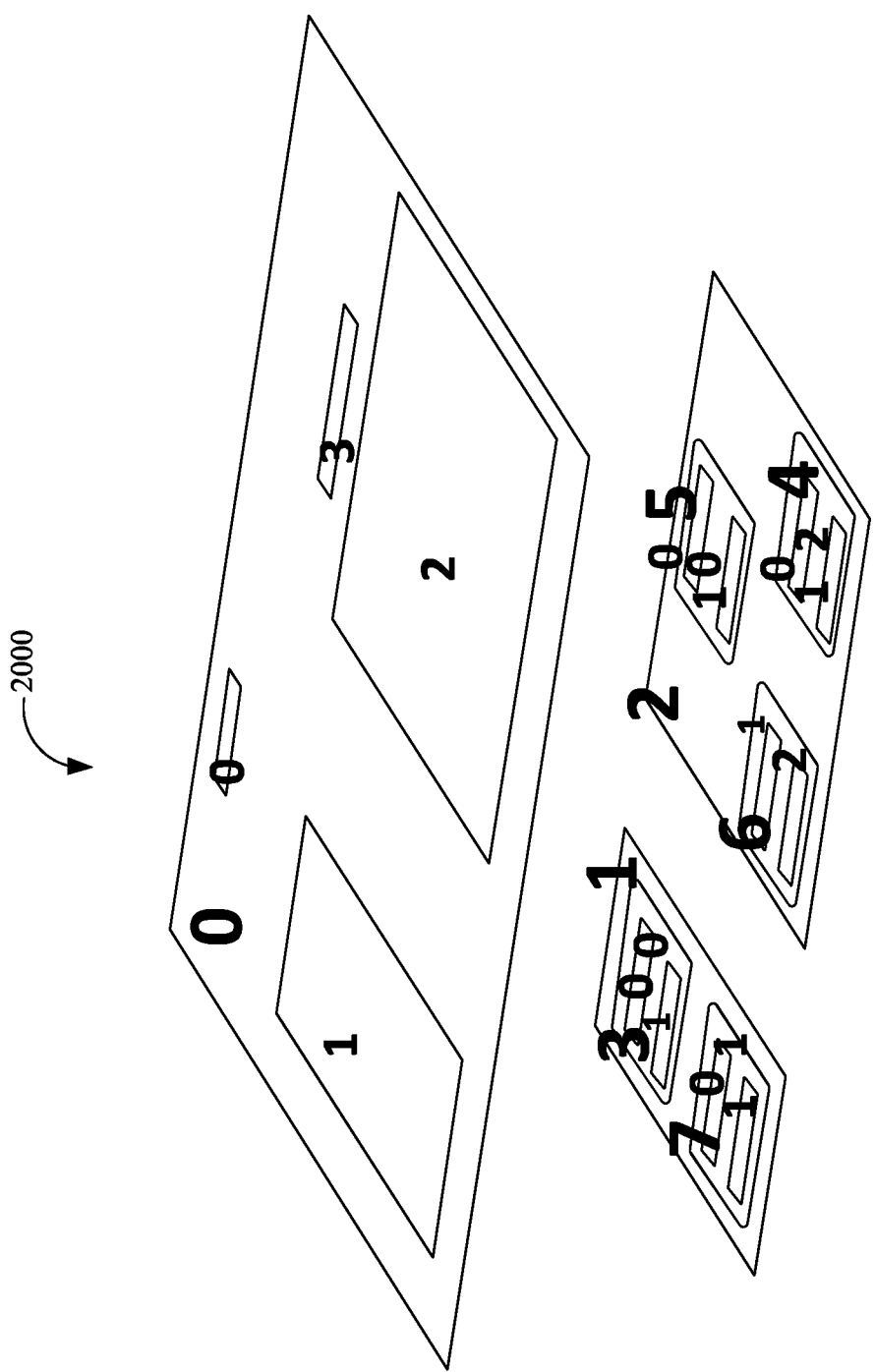
FIG. 20 is a schematic of an exploded view of the enumerated representation of the state machines corresponding to the plant, in accordance with some embodiments

FIG. 20 is a schematic of an exploded view of the enumerated representation of state machines 2000 corresponding to the plant 1800, in accordance with some embodiments.

Figure 21:
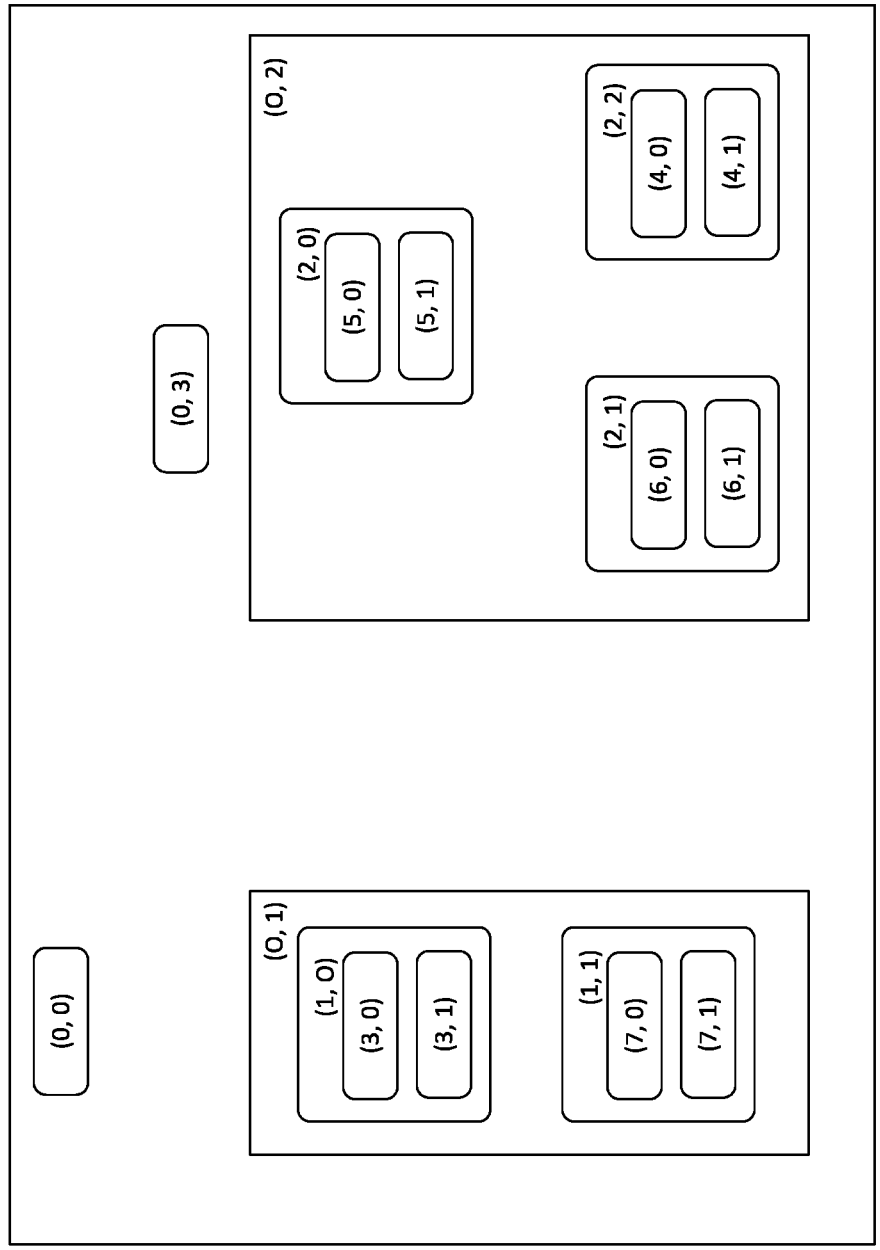
FIG. 21 is a schematic of a coordinate pair enumerated representation of the state machines corresponding to the plant, in accordance with some embodiments.

FIG. 21 is a schematic of a coordinate pair enumerated representation of state machines 2100 corresponding to the plant 1800, in accordance with some embodiments. Further, the plurality of state machines may be enumerated using a coordinate pair. Further, the at least one state corresponding to the each state machine may be enumerated using the coordinated pair.

Figure 22:
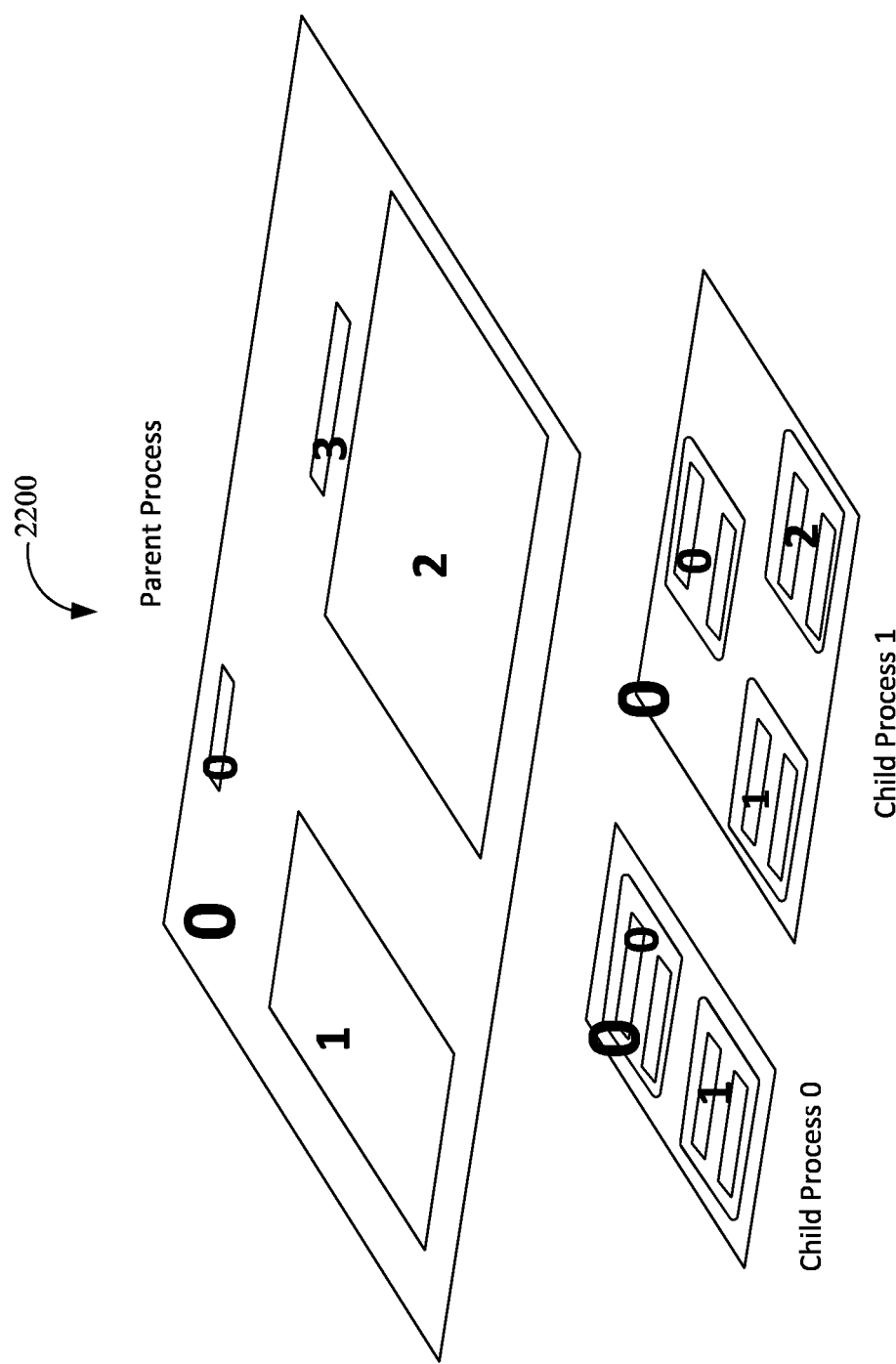
FIG. 22 is a schematic of a partitioned representation of the state machines corresponding to the plant, in accordance with some embodiments.

FIG. 22 is a schematic of a partitioned representation of state machines 2200 corresponding to the plant 1800, in accordance with some embodiments. Further, the plant 1800 may be partitioned in a plurality of processes creating a plurality microservices. Further, the plurality of microservices may be represented as the plurality of state machines. Further, each state machine of the plurality of state machines may be enumerated using the at least one integer.

Figure 23:
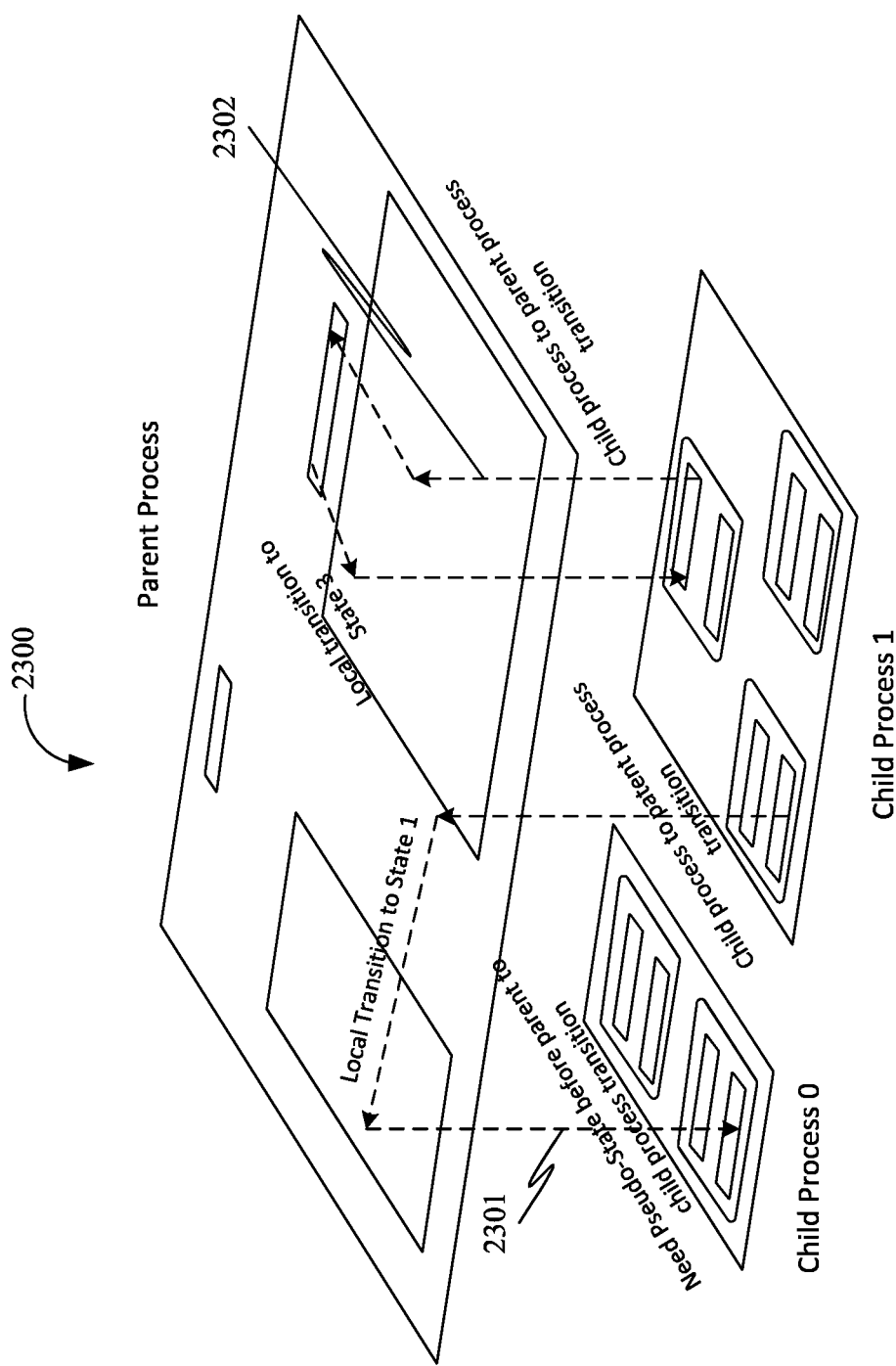
FIG. 23 is a schematic of the partitioned representation of the state machines corresponding to the plant, in accordance with some embodiments.

FIG. 23 is a schematic of a partitioned representation of state machines 2300 corresponding to the plant 1800, in accordance with some embodiments. Further, the partitioned representation of the plant may depict a hierarchical state machine spanning across multiple processes used as microservices. Further, state transitions within a single process may be triggered by at least one POSIX real time signal 2301 corresponding to at least one event. Further, process to process state transition may be triggered by at least one POSIX real time signal 2302 corresponding to at least one event.

Figure 24:
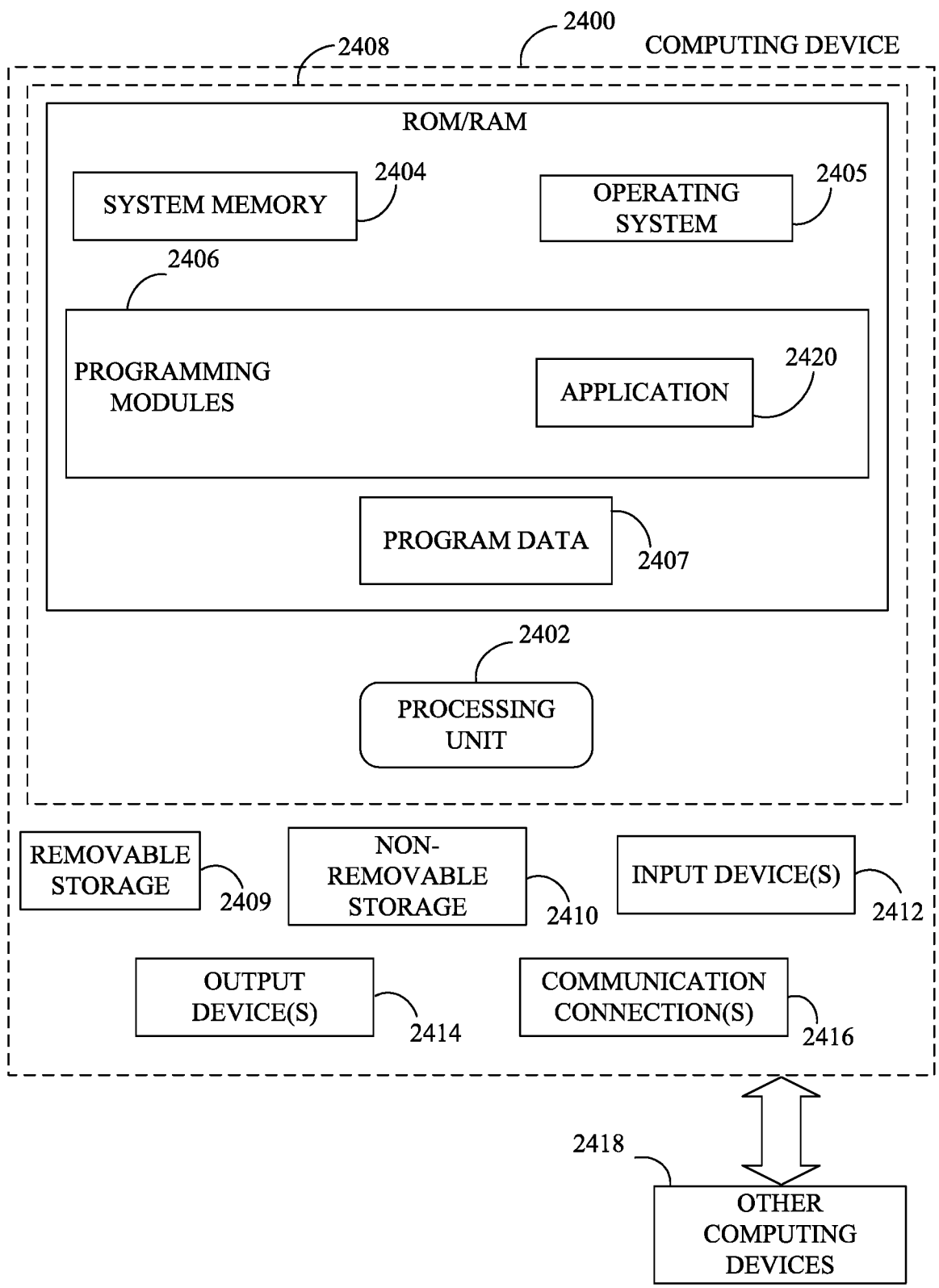
FIG. 24 is a block diagram of a computing device for implementing the methods disclosed herein, in accordance with some embodiments.

With reference to FIG. 24, a system consistent with an embodiment of the disclosure may include a computing device or cloud service, such as computing device 2400. In a basic configuration, computing device 2400 may include at least one processing unit 2402 and a system memory 2404. Depending on the configuration and type of computing device, system memory 2404 may comprise, but is not limited to, volatile (e.g. random-access memory (RAM)), non-volatile (e.g. read-only memory (ROM)), flash memory, or any combination. System memory 2404 may include operating system 2405, one or more programming modules 2406, and may include a program data 2407. Operating system 2405, for example, may be suitable for controlling computing device 2400's operation. In one embodiment, programming modules 2406 may include an image-processing module, machine learning module. Furthermore, embodiments of the disclosure may be practiced in conjunction with a graphics library, other operating systems, or any other application program and is not limited to any particular application or system. This basic configuration is illustrated in FIG. 24 by those components within a dashed line 2408.

Computing device 2400 may have additional features or functionality. For example, computing device 2400 may also include additional data storage devices (removable and/or non-removable) such as, for example, magnetic disks, optical disks, or tape. Such additional storage is illustrated in FIG. 24 by a removable storage 2409 and a non-removable storage 2410. Computer storage media may include volatile and non-volatile, removable and non-removable media implemented in any method or technology for storage of information, such as computer-readable instructions, data structures, program modules, or other data. System memory 2404, removable storage 2409, and non-removable storage 2410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2400. Any such computer storage media may be part of device 2400. Computing device 2400 may also have input device(s) 2412 such as a keyboard, a mouse, a pen, a sound input device, a touch input device, a location sensor, a camera, a biometric sensor, etc. Output device(s) 2414 such as a display, speakers, a printer, etc. may also be included. The aforementioned devices are examples and others may be used.

Computing device 2400 may also contain a communication connection 2416 that may allow device 2400 to communicate with other computing devices 2418, such as over a network in a distributed computing environment, for example, an intranet or the Internet. Communication connection 2416 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 2404, including operating system 2405. While executing on processing unit 2402, programming modules 2406 (e.g., application 2420 such as a media player) may perform processes including, for example, one or more stages of methods, algorithms, systems, applications, servers, databases as described above. The aforementioned process is an example, and processing unit 2402 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. An online platform for facilitating the development of software application based on an executable statechart, the online platform comprising: a communication device configured for: transmitting a software application design interface to a user device; receiving a plurality of design commands, through the software application design interface, from the user device; a processing device configured for generating an executable statechart design based on the plurality of design commands, wherein the executable statechart design comprises a plurality of microservices corresponding to a plurality of states of at least one state machine, wherein at least one first microservice is comprised in a first operating system process and at least one second microservice is comprised in a second operating system process, wherein a communication between the first operating system process and a second operating system process is facilitated through a communication channel provided by a Portable Operating System Interface (POSIX) Compliant Operating System (PCOS); and a storage device configured for storing the at least one executable statechart design.

2. The online platform of claim 1, wherein the executable statechart design comprises a plurality of executable statecharts, wherein the plurality of executable statecharts is implemented using a plurality of programming languages.

3. The online platform of claim 1, wherein the communication channel comprises a light-weight communication channel, wherein the communication channel facilitates the communication using at least one POSIX real-time signal, wherein the at least one POSIX real-time signal represents at least one event associated with the at least one state machine.

4. The online platform of claim 3, wherein the at least one POSIX real-time signal comprises at least one integer, wherein the at least one integer represents at least one event handler function associated with the at least one state machine.

5. The online platform of claim 4, wherein the at least one integer comprises at least one non-negative integer corresponding to at least one concrete state of the at least one state machine, wherein the at least one integer comprising at least one negative integer corresponding to at least one pseudo state of the at least one state machine.

6. The online platform of claim 3, wherein the at least one POSIX real-time signal comprises a payload, wherein the payload is characterized by a length of bytes associated with the POSIX Compliant Operating System, wherein, a first half of the length of bytes represents a state machine of a plurality of state machines, wherein a second half of the length of the bytes represent a state of a plurality of states of the state machine.

7. The online platform of claim 3, wherein the at least one executable statechart design comprises an execution timer configured for managing an execution time for the at least one executable statechart design, wherein the first operating system process is associated with a time delay, wherein a time stamp associated with at least one event is adjusted based on the time delay for managing the execution time.

8. The online platform of claim 1, wherein the POSIX Compliant Operating System (PCOS) is associated with at least one POSIX Compliant Operating System construct, wherein the at least one POSIX Compliant Operating System construct is based on a threaded event handling model.

9. The online platform of claim 1, wherein the POSIX Compliant Operating System (PCOS) is associated with at least one POSIX Compliant Operating System construct, wherein the at least one POSIX Compliant Operating System construct is based on a queued event handling model.

10. The online platform of claim 1, wherein the POSIX Compliant Operating System (PCOS) is associated with at least one POSIX Compliant Operating System construct, wherein the at least one POSIX Compliant Operating System construct comprises a queue management command, wherein the queue management command comprises at least one of a sigqueue command and a sigtimedwait command.

11. The online platform of claim 1, wherein the executable statechart design comprises at least one hierarchal executable statechart, wherein the least one hierarchal executable statechart comprises at least one parent executable statechart and a child executable statechart.

12. The online platform of claim 11, wherein the at least one parent executable statechart is implemented using a first programming language and the at least one child executable statechart is implemented using a second programming language disparate from the first programming language.

13. The online platform of claim 1 further comprising a dynamic transition table associated with the at least one state machine, wherein the dynamic transition table comprises a mapping of a plurality of integers representing a plurality of event handler functions with a plurality of tuples, wherein each tuple comprises an index corresponding to an executable statechart and an event identifier, wherein the dynamic transition table is configured to be updated periodically.

14. The online platform of claim 1, wherein the POSIX Compliant Operating System comprises a plurality of POSIX compliant queues, wherein the POSIX compliant Operating System comprises a communication channel between the plurality of POSIX compliant queues.

15. The online platform of claim 14 further comprises a hardware device configured to transmit control data to a POSIX compliant queue of the plurality of POSIX compliant queues.

16. The online platform of claim 1, wherein the POSIX Compliant Operating System comprises a plurality of event management functions, wherein the plurality of event management functions is associated with the at least one state machine, wherein the plurality of event management functions comprises event looping, event dispatching and event queuing.

17. The online platform of claim 1, wherein each state of the plurality states comprises a business logic, wherein the business logic is programmed using a plurality of programming languages, wherein the plurality of programming languages comprises a foreign function interface (FFI).

18. The online platform of claim 1, wherein each state of the plurality states comprises a business logic, wherein the business logic is programmed using a plurality of programming languages, wherein the plurality of programming languages comprises a C foreign function interface (CFFI).

19. An online platform for facilitating the development of software application based on an executable statechart, the online platform comprising: a communication device configured for: transmitting a software application design interface to a user device; receiving a plurality of design commands, through the software application design interface, from the user device, wherein the plurality of design commands represent an executable statechart design comprising a plurality of microservices corresponding to a plurality of state machines, wherein at least one first microservice corresponds to a first operating system process and at least one second microservice corresponds to a second operating system process, wherein a communication between the first operating system process and the second operating system process is implemented as a transition from a first state of a first state machine corresponding to the first microservice to a second state of a second state machine corresponding to the second microservice, wherein the transition is based on at least one event received from a Portable Operating System Interface (POSIX) Compliant Operating System (PCOS) queue; a processing device configured for generating the software application design interface; and a storage device configured for storing the executable statechart design.

20. The online platform of claim 19, wherein the plurality of microservices corresponds to at least one state machine of the plurality of state machines, wherein the communication between the first operating system process and the second operating system process is implemented as the transition of the at least one state machine from a first state corresponding to the first microservice to a second state corresponding to the second microservice.

* * * * *